United States Patent [19]

Nio et al.

[11] Patent Number: 4,590,577
[45] Date of Patent: May 20, 1986

[54] WELDING ROBOT CONTROLLING METHOD

[75] Inventors: Satoru Nio, Kitakyushu; Toyoji Hamashima, Nakama; Shinobu Sato, Kitakyushu, all of Japan

[73] Assignee: Yaskawa Electric Mfg. Co., Ltd., Kitakyushu, Japan

[21] Appl. No.: 432,785

[22] Filed: Dec. 1, 1982

[51] Int. Cl.$^4$ .................. B23R 9/02; B23R 9/12
[52] U.S. Cl. .................. 364/513; 219/124.33; 219/125.1; 364/477; 901/3; 901/4; 901/42
[58] Field of Search .......... 364/513, 474, 169, 170, 364/477, 559; 318/568, 573, 576; 901/3, 4, 42; 219/124.03, 124.1, 124.22, 124.33, 124.34, 125.1, 125.12, 130.01

[56] References Cited

U.S. PATENT DOCUMENTS

| | | | |
|---|---|---|---|
| 4,135,238 | 1/1979 | Hamill, III et al. | 364/169 X |
| 4,169,224 | 9/1979 | Puschner | 219/124.1 X |
| 4,249,062 | 2/1981 | Hozumi et al. | 901/42 X |
| 4,258,425 | 3/1981 | Ramsey et al. | 364/477 X |
| 4,308,584 | 12/1981 | Arai | 364/513 |
| 4,380,695 | 4/1983 | Nelson | 219/124.22 X |
| 4,380,696 | 4/1983 | Masaki | 364/513 X |
| 4,409,650 | 10/1983 | Noguchi | 318/568 X |
| 4,410,786 | 10/1983 | Cloos | 219/125.12 |
| 4,417,126 | 11/1983 | Kasahara et al. | 219/125.12 X |
| 4,445,184 | 4/1984 | Noguchi | 364/513 |
| 4,448,342 | 5/1984 | Abe et al. | 364/513 |
| 4,449,030 | 5/1984 | Blomdahl | 219/124.03 X |

*Primary Examiner*—Jerry Smith
*Assistant Examiner*—Allen MacDonald
*Attorney, Agent, or Firm*—Jordan and Hamburg

[57] ABSTRACT

A welding robot controlling method for controlling a welding robot having a welding torch which has a tip thereof directed toward a teaching direction and sensor which intermittently generates a locus correction signal for the tip of the welding torch, comprising, (1) giving the locus correction signal as a resultant vector of an arbitrary number of two-dimensional vectors on a plane which intersects a welding line direction, (2) correcting a locus by controlling the three basic axes of the robot in a direction of a resultant vector which is composed of a predetermined length vector of which direction is parallel to a line connecting two teaching points and which passes through a tip of the welding torch and the locus correction vector, when the locus correction signal is generated, (3) controlling the three basic axes of the robot such that the tip of welding torch moves on a line which is parallel to the line connecting the two teaching points, until a subsequent locus correction signal is again given after completion of the locus correction.

48 Claims, 23 Drawing Figures

WELDING ROBOT CONTROLLING METHOD

BACKGROUND OF INVENTION

The present invention relates to a weld line profiling control method for the arc welding robot.

In effecting fillet welding as shown in FIG. 1a or single-V groove welding as shown in FIG. 1b with a conventional consumable electrode arc welding apparatus, a carriage carrying a welding torch 1, which is capable of weaving motion, is made to run along the groove line, in which a welding bead 2 is deflected when the carriage is incorrectly guided. In order to eliminate this problem, an automatic weld line tracking and profiling controller has been proposed. The controller is provided with an actuator adapted to move the welding torch 1 horizontally along the weaving direction with respect to the weld line by taking advantage of a fact that the respective welding currents or the welding voltages at both laterally extreme positions of the weaving differ from each other when the center of weaving of the welding torch tip is deflected from the weld line, the actuator is controlled so as to make the difference between the respective detected values detected at both laterally extreme positions of weaving zero to form aligned weld beads, and the actuator is controlled also along the vertical direction (direction of the consumable electrode) to always make the detected values constant.

When this profiling method is applied to known cylindrical coordinates robots, polar coordinates robots, Cartesian coordinates robots or articulated robots, the arc welding robot will assume, for example, a structure as shown in FIG. 2.

FIG. 2 shows an example of application of above-mentioned method to an articulated robot, in which a weaving unit 3, a horizontal drive actuator 4 and a vertical drive actuator 5 are mounted on the robot wrist.

Since three actuators for driving three axes in total of two axes of the actuators and one axis of the weaving unit are to be mounted on the robot wrist, the size and the weidht of the drive actuators cause problems. Namely, the increased weight of the working tool increases the load on the robot wrist, which is undesirable from the viewpoint of the durability of the robot wrist. The increased size of the working tool causes difficulty in extending the robot wrist into a narrow position, thereby the weld position is restricted and the versatility of the welding robot is reduced.

This invention is directed to the method for controlling a welding robot which can eliminate those disadvantages.

This invention provides that the three-axes actions of the weaving axis, horizontal actuator and vertical axis actuator, or the two-axes actions of the horizontal and vertical actions are effected by three basic axes for performing the three-dimensional motion of the robot instead of these actuators. More particularly, while the center of weaving is controlled so as to follow a previously taught locus or a locus given by parallely shifting the previously taught locus in a three-dimensional space, the welding current or the welding voltage is detected every time the torch reaches the laterally extreme positions of weaving and compared with the detected value of the preceding laterally extreme position of weaving, the position of the center of weaving is shifted (correcting control) by controlling the three basic axes of the robot both in a direction to cancel the difference between the detected value and the preceding detected value when there is a difference, namely, in a direction to the right or to the left with respect to the direction of movement of the center of weaving (actual weld line), and in a direction to cancel the difference between the mean value of the welding current or the welding voltage detected at the preceding laterally extreme position of weaving and at the instant laterally extreme position of weaving, and the preset value of the welding current or the welding voltage when there is any difference, namely, in an upward or downward direction with respect to the direction of movement of the center of weaving (a direction perpendicular to the weaving direction). As the result, the position of the center of weaving is shifted toward the resultant vector composed of above-mentioned "right" or "left" and/or "up" or "down" vectors. Thus the deviation of the center of weaving from the actual weld line is corrected, and the welding current or the welding voltage is controlled to a fixed value for correct weaving welding.

Other objects of the invention relate to control methods effective in applying the control method of the invention to the teaching playback robot. Those control methods will be described hereinafter with reference to the drawings.

DETAILED DESCRIPTION OF DISCLOSURE

Figure 1A:
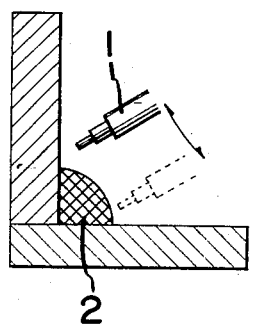
FIGS. 1A and 1B are explanatory views of a weaving welding.
Figure 1B:
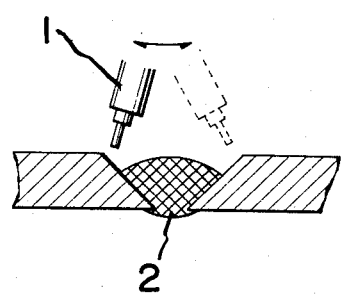
Figure 2:
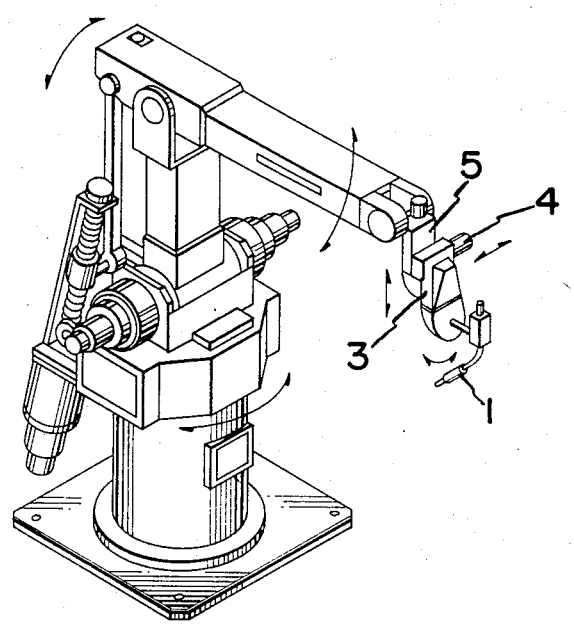
FIG. 2 is a perspective view of an arc welding robot employing a conventional weaving welding method.
Figure 3:
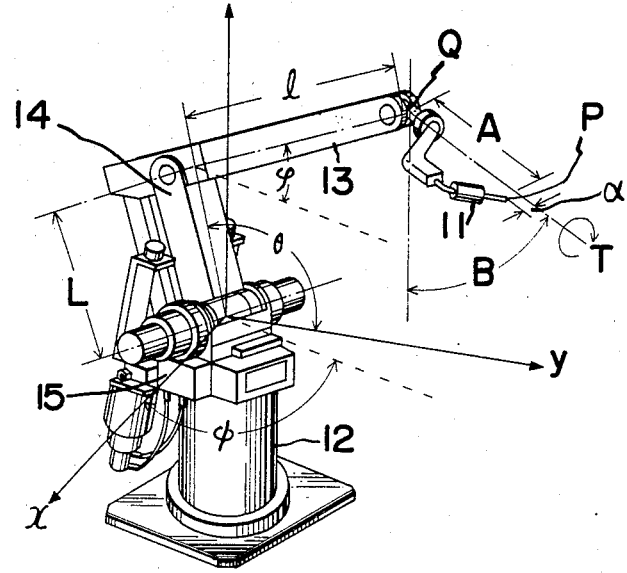
FIG. 3 is a perspective view of an arc welding robot embodying the present invention.

FIG. 3 shows an exemplary articulated teaching playback robot which is suitable for applying the control method of the present invention, in which a consumable electrode welding torch is indicted at 11.

The welding robot includes a turning unit 15 mounted on a stand 12. Two articulated arms 13 and 14 are mounted on the turning unit 15. The bending angle and the turning angle of the welding torch 11 attached to the free end of the arm 13 can be changed by means of drive motors. The welding torch 11 is oscillated to provide a weaving motion by controlling the motions of the arms 13 and 14 and the turning unit 15.

Figure 4:
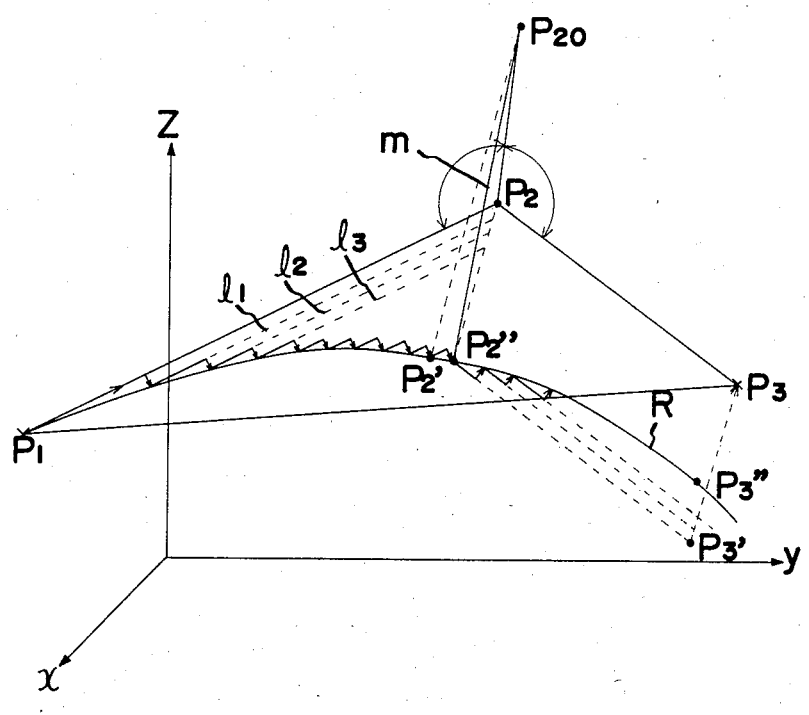
FIG. 4 is an explanatory view of a profiling control method in accordance with the present invention.

As well known, when two points are taught to the teaching playback robot by means of a teach box (not shown), the teaching playback robot moves the welding torch 11 along the line connecting those two points through a linear interpolation. Therefore, it is necessary to provide many teaching points to make the welding torch track a work weld line R including a curve as shown in FIG. 4 to attain the correct welding when the robot has no locus correcting function.

The control method of this invention enables the welding torch to track the work weld line R by roughly giving three teaching points $P_1$, $P_2$ and $P_3$. This control method allows simple teaching operation before starting welding operation, and correct welding even when the accuracy of the workpiece itself or the work positioning is poor.

The principle of the control method of this invention will be described hereunder in conjunction with FIG. 4.

In order to make the center of weaving of the welding torch 11 of the robot follow the work weld line R, it is necessary to make the center of weaving always coincide with the weld line during the weaving motion for the deviation detection. The center of weaving must be moved in a direction corresponding to a locus correction signal provided at the laterally extreme positions of weaving and then, the center of weaving must be made to follow loci ($l_1$, $l_2$, $l_3$ . . . ) given by parallelly shifting the previously taught locus in a three-dimensional space. The three motions, i.e. the weaving motion, the movement of the center of weaving along the loci given by three-dimensionally-parallelly shifting the teaching locus and the locus correcting motion for the center of weaving, are effected by the three basic axes of the robot. During the weaving motion to the right and left by the same distances from the center of weaving, the center of weaving is shifted to a direction corresponding to the locus correction signal given at the laterally extreme positions of weaving when the locus correction signal is given. After the completion of the locus correction, the center of weaving follows a newly given locus which is given by three-dimensionally-parallelly shifting the taught locus, while waiting for the next locus correction signal. Thus, the center of weaving reaches a point $P_2''$ while repeating above-mentioned motions.

After the point $P_2''$, namely the inflection point, the weld line R tracking control is effected on the basis of the line $P_2P_3$ instead of line $P_1P_2$.

The detection of the inflection point $P_2''$ for changing the direction of parallel shifting can be attained by placing an inflection detection monitoring point $P_{20}$ within the supplementary angle of the angle $\angle P_1P_2P_3$, by continuously calculating the distance m between the center of weaving of the welding torch and the monitoring point $P_{20}$ and by detecting a point $P_2''$ which provides a distance greater than the minimum value of the distance by a certain width of variation.

It is preferable to set the point $P_{20}$ on the bisector of the angle $\angle P_1P_2P_3$.

Such tracking control provides a correct weaving welding even when the teaching is operated very roughly as compared with the conventional method and contributes to the improvement of the operation of the welding robot.

Figure 5:
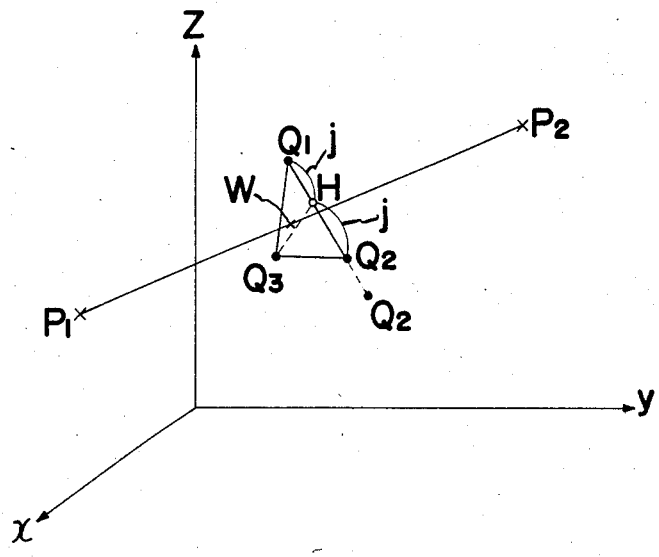
FIG. 5 is an explanatory view of teaching positions for defining the weaving motion.

Referring to FIG. 5, the weaving motion effected by the three basic axes of the robot will be described below.

Prior to the operation of the robot, it is necessary to teach the conditions required for profile welding, such as the weaving direction, the weaving amplitude, and the weaving frequency, to the robot.

The weaving direction and the weaving amplitude are set by teaching desired three points $Q_1$, $Q_2$ and $Q_3$ between teaching points $P_1$ and $P_2$. The point $Q_3$ must be provided because the weaving plane cannot be determined only with the two points $Q_1$ and $Q_2$. A perpendicular is drawn from the point $Q_3$ to a line $Q_1Q_2$ to determine the foot H of the perpendicular and a point $Q_2'$ which meets a condition $Q_1H=HQ_2'=J$, is sought. The simple harmonic weaving motion of the same amplitude with respect to the center H of weaving is effected along a course of $H \rightarrow Q_1 \rightarrow H \rightarrow Q_2' \rightarrow H$. Provided that:

$$P_1(x_1,y_1,z_1), P_2(x_2,y_2,z_2), P_3(x_3,y_3,z_3),$$

$$Q_1(x_1,y_1,z_1), Q_2(x_2,y_2,z_2), Q_3(x_3,y_3,z_3) \qquad (1)$$

and $(\alpha,\beta,\gamma)$ . . . the direction cosine of $Q_1Q_2$ $(\alpha',\beta',\gamma')$ . . . the direction cosine of $Q_1Q_3$ $(\lambda,\mu,\nu)$ . . . the direction cosine of $P_1P_2$ \qquad (2)

the coordinates $(x_w, y_w, z_w)$ of a point W of intersection between the plane defined by points $Q_1$, $Q_2$ and $Q_3$ and the line $P_1P_2$ are determined to:

$$x_w = f_1(x_1,y_1,z_1,x_1,y_1,z_1,\alpha,\beta,\gamma,\alpha',\beta',\gamma',\lambda,\mu,\nu)$$

$$y_w = f_2(x_1,y_1,z_1,x_1,y_1,z_1,\alpha,\beta,\gamma,\alpha',\beta',\gamma',\lambda,\mu,\nu)$$

$$z_w = f_3(x_1,y_1,z_1,x_1,y_1,z_1,\alpha,\beta,\gamma,\alpha',\beta',\gamma',\lambda,\mu,\nu) \qquad (3)$$

where the symbols $f_1$, $f_2$ and $f_3$ represent functional equations.

$P_1$, $P_2$, $P_3$, $Q_1$, $Q_2$ and $Q_3$ are teaching points and their coordinates are known. Therefore, the values $\alpha$, $\beta$, $\gamma$, $\alpha'$, $\beta'$, $\gamma'$, $\lambda$, $\mu$ and $\nu$, namely the values of $x_w$, $y_w$, $z_w$, can easily be obtained by means of a micro processor.

Although the center of weaving is H, the center of weaving is represented by the intersection W in this description for facilitating the understanding. This center W of weaving moves from the point $P_1$ to the point $P_2''$ in FIG. 4, while effecting the profiling operation. The torch tip mounted on the robot wrist does not follow the locus of the point W, but follows a locus given by adding a vector WH and an instant weaving distance from the point H to the varying value of W. Point W follows vector $P_1P_2$ or the three-dimensionally-parallelly-shifted loci $l_1$, $l_2$ . . . of the vector $P_1P_2$.

And point W follows the corrected loci responsive to the locus correction signals.

In order to obtain the coordinates of the weaving point of the torch tip at K clockpulses after the torch tip has started from the point H, a distance S which the torch tip moves on within the period of one reference clock pulse along the line $Q_1Q_2'$ is obtained:

$$S = 4hjC_0 \quad (4)$$

where $C_0$ is the period of the reference clock pulse and h is the frequency of weaving motion.

$\Delta x$, $\Delta y$ and $\Delta z$ which are the x, y, z components of the distance S are represented by the following equations respectively:

$$\Delta x = -S\alpha, \Delta y = -S\beta \text{ and } \Delta z = -S\gamma \quad (5)$$

The instant coordinates $x_k$, $y_k$ and $z_k$ on the weaving pattern after N reference clock pulses is represented by equations as follows:

$$x_k = N \cdot \Delta x, y_k = N \cdot \Delta y, z_k = N \cdot \Delta z \quad (6)$$

when the torch tip returns at point $Q_1$ and $Q_2'$ during the weaving motion through $H \rightarrow Q_1 \rightarrow H \rightarrow Q_2' \rightarrow H$, naturally the signs of $\Delta x$, $\Delta y$ and $\Delta z$ are inverted.

The length and direction of vector WH are always constant and the components of the vector WH, $x_0$, $y_0$ and $z_0$ are represented by equations as follows:

$$x_0 = x_1 + j\alpha - x_w, y_0 = y_1 + j\beta - y_w, z_0 = z_1 + j\gamma - z_w \quad (7)$$

Thus, the torch tip follows a locus given by adding the coordinates of the center W of weaving to Equations (6) and (7). As shown in FIG. 4, initially, the center W of weaving starts moving along the line connecting the point $P_1$ and the point $P_2$. Then, corresponding to the locus correction signals produced at the laterally extreme positions of weaving, the center W of weaving is corrected and follows a new locus $l_1$ which is parallel to the line $P_1P_2$. Thus the center W of weaving is controlled both in the correction mode as well as in the parallel shifting mode. In the correction mode, the directions to the right and to the left with respect to the advancing direction of the center W of weaving, are defined by vector $Q_2'Q_1$ and $Q_1Q_2'$. And the directions to the upward and to the downward are the vector product of vectors $Q_1Q_2$ and $P_1P_2$. Suppose the angle $\angle P_2HQ_2'$ takes $\omega$ when the line $Q_1Q_2$ is parallelly shifted and made to intersect the line $P_1P_2$ at point H, the vertical direction cosine (e, f, g) are written as follows.

$$e = f_4(\omega,\beta,\gamma,\mu,\nu), f = f_5(\omega,\alpha,\gamma,\lambda,\nu),$$

$$g = f_6(\omega,\alpha,\beta,\lambda,\mu) \quad (8)$$

The transverse direction cosine (right-left direction cosine) are $\alpha$, $\beta$, $\gamma$.

Figure 6:
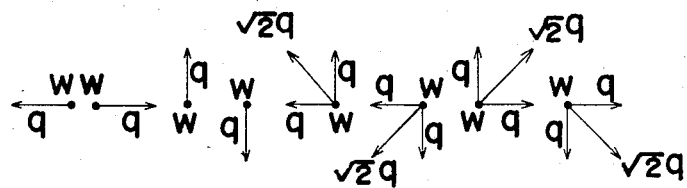
FIGS. 6 and 7 are diagrams of correction vectors.

FIG. 6 shows eight kinds of locus correction signals, each of which is represented by a resultant vector (hereinafter called "a correction vector") consisting of one or two two-dimensional vector/vectors represented respectively by a binary quantity.

In FIG. 6, a vector in a traverse direction and a vector in a vertical direction are shown as an example of two two-dimensional vectors.

FIG. 6 shows two-dimensional vectors as one or two, however, it is understood that three or more two-dimensional vectors may be used to obtain a corection vector.

The direction cosine of the correction vector (u, v, w) is written as follows:

$$u = f_7(\alpha,e), v = f_8(\beta,f), w = f_9(\gamma,g) \quad (9)$$

Figure 7:
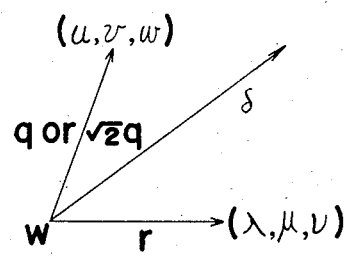

When no correction is made, the advancing direction of the center W of weaving is parallel to the line $P_1P_2$ and the direction cosine becomes the above-mentioned direction cosine ($\lambda$, $\mu$, $\nu$). FIG. 7 shows a direction of correction, in which the center W of weaving is moved in the direction of ($\lambda$, $\mu$, $\nu$) by r. The x, y and z components $\delta_x$, $\delta_y$ and $\delta_z$ of the corrected resultant vector of the actual center of weaving are written:

$$\begin{aligned}
\overline{\delta_x} &= f_{10}(r, q, \lambda, \mu, \nu, \alpha, \beta, \tau, e, f, g) \\
\overline{\delta_y} &= f_{11}(r, q, \lambda, \mu, \nu, \alpha, \beta, \tau, e, f, g) \\
\overline{\delta_z} &= f_{12}(r, q, \lambda, \mu, \nu, \alpha, \beta, \tau, e, f, g)
\end{aligned} \quad (10)$$

The positional segment quantity every reference clock under the parallel shifting mode to obtain the required welding speed V is expressed by:

$$\begin{aligned}
\bar{x}_{n0} &= \frac{(\overline{x_2} - \overline{x_1})C_0 V}{\sqrt{(\overline{x_2} - \overline{x_1})^2 + (\overline{y_2} - \overline{y_1})^2 + (\overline{z_2} - \overline{z_1})^2}} \\
\bar{y}_{n0} &= \frac{(\overline{y_2} - \overline{y_1})C_0 V}{\sqrt{(\overline{x_2} - \overline{x_1})^2 + (\overline{y_2} - \overline{y_1})^2 + (\overline{z_2} - \overline{z_1})^2}} \\
\bar{z}_{n0} &= \frac{(\overline{z_2} - \overline{z_1})C_0 V}{\sqrt{(\overline{x_2} - \overline{x_1})^2 + (\overline{y_2} - \overline{y_1})^2 + (\overline{z_2} - \overline{z_1})^2}}
\end{aligned} \quad (11)$$

The distances represented by $\delta_x'$, $\delta_y'$ and $\delta_z'$ through which the center of weaving W moves in K times of reference clock pulses in the parallel shifting mode except the correction mode are expressed by:

$$\delta_{x'} = x_1 + x_{n0} \cdot k, \delta_{y'} = y_1 + y_{n0} \cdot k, \delta_{z'} = z_1 + z_{n0} \cdot k \quad (12)$$

In the correction mode for making the center W of weaving follow the vector $\delta$ of FIG. 7, the movement in the r direction is controlled at the required speed V. Therefore, the center W of weaving moves by a distance $\delta$ in a time r/V. Accordingly, the movements $x_{n1}$, $y_{n1}$ and $z_{n1}$ in the direction of $\delta$ at every reference clock pulse are expressed by:

$$x_{n1} = C_0 \cdot V/r \cdot \delta_x, y_{n1} = C_0 \cdot V/r \cdot \delta_y, z_{n1} = C_0 \cdot V/r \cdot \delta_z \quad (13)$$

The movement in K' times of reference clock pulses in the correction mode are expressed by:

$$\delta_{x1} = x_{n1} \cdot K', \delta_{y1} = y_{n1} \cdot K', \delta_{z1} = z_{n1} \cdot K' \quad (14)$$

The difference between $\delta_{x1}$, $\delta_{y1}$, $\delta_{z1}$ and $\delta_x$, $\delta_y$, $\delta_z$ is corrected at the final step of the correction mode so that they agree with each other.

Consequently, the coordinates $x_n$, $y_n$, $z_n$ of the center W of weaving after N times of reference clock pulses are expressed by:

$$\left.\begin{array}{l}x_n = \overline{\delta_x}' + \overline{\delta_{x1}} = \overline{x_1} + \overline{x_{n0}} \cdot k + C_0 V/r \cdot \overline{\delta_x} \cdot K'\\ y_n = \overline{\delta_y}' + \overline{\delta_{y1}} = \overline{y_1} + \overline{y_{n0}} \cdot k + C_0 V/r \cdot \overline{\delta_y} \cdot K'\\ z_n = \overline{\delta_z}' + \overline{\delta_{z1}} = \overline{z_1} + \overline{z_{n0}} \cdot k + C_0 V/r \cdot \overline{\delta_z} \cdot K'\end{array}\right\} \quad (15)$$

$$N = K + K' \quad (16)$$

As described hereinbefore, the coordinates $x_n$, $y_n$, $z_n$ of the control point of the welding torch tip will be controlled in accordance with the followings.

$$X_n = x_n + x_k + x_0, Y_n = y_n + y_k + y_0, Z_n = z_n + z_k + z_0 \quad (17)$$

In order to obtain the end point $P_2''$ of the step, the distance D between the point $P_{20}(x_{20}, y_{20}, z_{20})$ and the center W of weaving is calculated at every clock pulse and the minimum value is stored.

$$D = \sqrt{(\overline{x_{20}} - x_n)^2 + (\overline{y_{20}} - y_n)^2 + (\overline{z_{20}} - z_n)^2} \quad (18)$$

The minimum value is renewed as the center W of weaving approaches the point $P_2$. The distance D becomes greater than the stored minimum value after the center W of weaving passes the point $P_2''$. As the center W of weaving moves from the point $P_1$ to the point $P_2''$, the distance D decreases on an average. However, the value of the distance D does not necessarily decrease in a microscopic sense depending on the correction vector in the correction mode. This problem is solved by allowing a small width of variation to the preceding minimum value. The point where the distance D is smaller than the lower limit of the width of variation will be the end point of the step.

Figure 13:
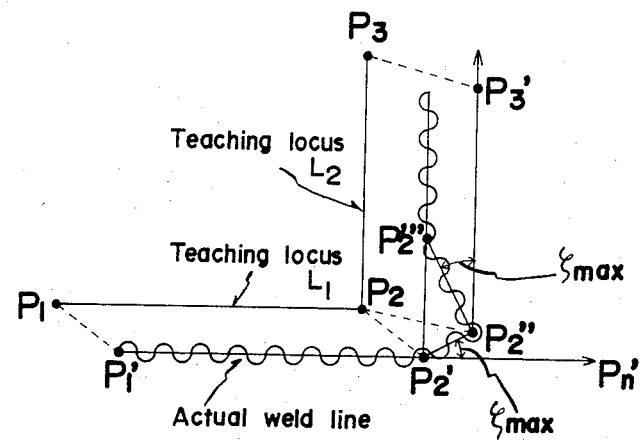
FIG. 13 is an explanatory view of a manner of profiling welding at a sharp inflection point in the fillet welding.
Figure 14:
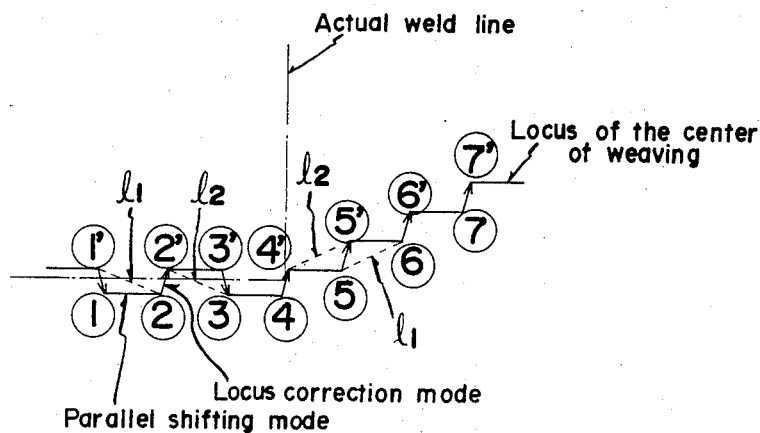
FIG. 14 is a partial enlarged explanatory view of FIG. 13, FIGS. 15A and 15B are views illustrating the teaching points and the posture of the welding torch in fillet welding.

This inflection point detecting method is effective for detecting the inflection point on a gentle curve as shown in FIG. 4, however, it is not applicable to detecting the inflection point on a sharp corner such as a corner of a right angle. Accordingly, inflection point detecting methods as shown in FIGS. 13 and 14 are employed in combination with the above-mentioned method.

The control of the robot wrist axes will be described below.

The wrist postures must be controlled so that the torch angle and the advancing angle with respect to the weld line are within the respective ranges of variation which are dependent on the welding conditions. Naturally, the wrist postures at the teaching points $P_1$, $P_2$ and $P_3$ are correctly taught. In the profile welding operation from the point $P_1$ to the point $P_2$, the increments $\Delta B$ and $\Delta T$ per one reference clock Co are determined by:

$$\left.\begin{array}{l}\Delta B = \dfrac{(\overline{B_2} - \overline{B_1})VC_0}{\sqrt{(\overline{x_2} - \overline{x_1})^2 + (\overline{y_2} - \overline{y_1})^2 + (\overline{z_2} - \overline{z_1})^2}}\\[1em] \Delta T = \dfrac{(\overline{T_2} - \overline{T_1})VC_0}{\sqrt{(\overline{x_2} - \overline{x_1})^2 + (\overline{y_2} - \overline{y_1})^2 + (\overline{z_2} - \overline{z_1})^2}}\end{array}\right\} \quad (19)$$

where $B_1$, $T_1$, $B_2$, and $T_2$ are the coordinates of a wrist bending angle B and a wrist turning angle T at the points $P_1$ and $P_2$, respectively.

The increments are added at every reference clock pulse, and as the welding advances from the point $P_1$ to the point $P_2''$, the wrists are uniformly changed irrespective of either the correction mode or the parallel shifting mode. Thus the angles $B_n$ and $T_n$ after N times of the reference clock pulses are:

$$B_n = B_1 + \Delta B \cdot N, T_n = T_1 + \Delta T \cdot N \quad (20)$$

Generally, the bending angle B and the turning angle T at the end point $P_2''$ will not be the same with the bending angle $B_2$ and the turning angle $T_2$. However, the workpiece deviation from the teaching line is exaggerated in FIG. 4, and actually, the differences between respective angles are not significant in the practical welding, since the distance between the points $P_2$ and $P_2''$ is small in the actual welding operation. Thus the welding torch is kept in correct torch posture during the profiling welding operation.

The values x, y and z of Equation (1) represent the values of the control point, namely, the welding torch tip. In order to establish the Equation (1), it is necessary to convert the stored coordinate data of the drive axes of the points $P_1$, $P_2$, $Q_1$, $Q_2$ and $Q_3$ into data of orthogonal coordinates, irrespective of the types of the robot, i.e. the Cartesian coordinates robot, the articulated robot, the cylindrical coordinates robot or the polar coordinated robot.

The solution $X_n$, $Y_n$ and $Z_n$ of the Equation (17) have to be inverted to the drive axis data of the three basic axes of the robot in order to realize the correct position of the welding torch ($X_n$, $Y_n$, $Z_n$, $B_n$, $T_n$) at every reference clock pulse. The data of the robot wrist axes comprises the bending angle $B_n$ and the turning angle $T_n$.

The three basic axes, namely, the basic axes of the swiveling unit 15 and arms 13 and 14, of the robot embodying the present invention as shown in FIG. 3, are controlled by the respective angles of rotation $\psi$, $\phi$ and $\theta$ while the wrist bending axis and the wrist turning axis are controlled by angles of rotation B and T, respectively. The control point P is the tip of the welding torch 11.

Since the point P which is apart from the center of the wrist bending axis by a distance A and from the center of the wrist turning axis by a distance d respectively, is the control point which has previously been taught, the Cartesial coordinates of the point are expressed:

$$\left.\begin{array}{l}X = (L\cos\theta + l\cos\phi + A\sin B + d\cos T \cdot \cos B)\cos\phi - d\sin T \cdot \sin\phi\\ Y = (L\cos\theta + l\cos\phi + A\sin B + d\cos T \cdot \cos B)\sin\phi + d\sin T \cdot \cos\phi\\ Z = L\sin\theta + l\sin\phi - A\cos B + d\cos T \cdot \sin B\end{array}\right\} \quad (21)$$

The angles of rotation $\psi_n$, $\theta_n$ and $\phi_n$ of three basic axes of an articulated robot are determined by the following equations produced by inverting Equation (21) using $X_n$, $Y_n$ and $Z_n$ determined by Equation (17) and $B_n$ and $T_n$ determined by Equation (20):

$$\left.\begin{array}{l}\phi_n = f_{13}(X_n, Y_n, Z_n, B_n, T_n)\\ \theta_n = f_{14}(X_n, Y_n, Z_n, B_n, T_n)\\ \phi_n = f_{15}(X_n, Y_n, Z_n, B_n, T_n)\end{array}\right\} \quad (22)$$

Equations (21) and (22) are defined according to the type of the robot.

Figure 8:
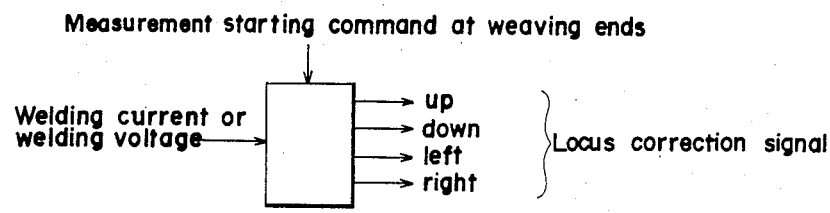
FIG. 8 is an explanatory illustration of the input and output signals of the sensor circuit.

FIG. 8 shows a sensor circuit capable of producing locus correction signals for shifting the center of weaving vertically and transversely by a fixed amount q on the basis of the welding voltage or welding current detected at the laterally extreme positions of weaving.

When the teaching points $Q_1$, $Q_2$ and $Q_3$, which have been described with reference to FIG. 5, are given, the coordinates of the foot H of the perpendicular is obtained. When such coordinate of the foot is expressed by xh, yh and zh, the instant amplitude j' can be determined by the instant value of the weaving xk, yk and zk (Equation (6)).

$$j' = \sqrt{\{(x_h+x_k)-x_h\}^2 + \{(y_h+y_k)-y_h\}^2 + \{(z_h+z_k)-z_h\}^2} \quad (23)$$

$$\text{i.e. } j' = \sqrt{x_k^2 + y_k^2 + z_k^2}$$

The value of j' becomes j at the laterally extreme positions of the weaving where a measurement start command is given to the sensor circuit.

A "Left" signal or a "Right" signal is generated when the center of weaving of the welding torch shifts to the right or to the left from the actual weld line, respectively. When the mean of the values of welding current or voltage at the laterally extreme positions of weaving is greater or smaller than a preset value, an "Up" or "Down" signal is generated, respectively. Eight combinations of such signals for vertical and transverse shifting are available (FIG. 6).

Figure 9:
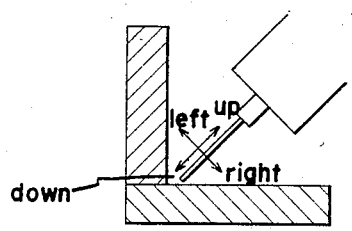
FIG. 9 is a view showing the direction of welding torch control.

FIG. 9 defines the "Up", "Down", "Right" and "Left" directions used in the description. The right and left direction and the up and down direction correspond to the weaving direction and the torch direction, i.e. the feed direction of a wire electrode 11a, respectively.

Figure 10:
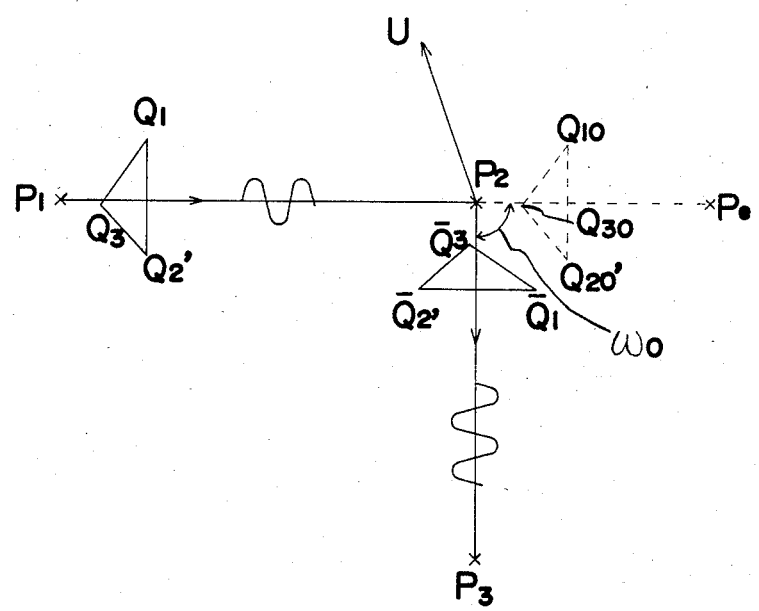
FIG. 10 is an explanatory view of the automatic continuation of a weaving pattern.

FIG. 10 is a view for facilitating the explanation of the automatic continuation of a weaving teaching pattern. Referring to FIG. 10, the points $P_1$, $P_2$ and $P_3$ are teaching points similar to those of FIG. 5, while the meaning of the points $Q_1$, $Q_2'$ and $Q_3$ is the same as those of FIG. 5.

A point Pe is determined on the extension of a line $P_1P_2$. When the point $P_1$ and a triangle $\Delta Q_1Q_2'Q_3$ are parallelly shifted along the line $P_1P_2$ with the fixed relationship therebetween until the point $P_1$ coincides with the point $P_2$, the line $Q_1Q_2'$ is brought to superpose a line $Q_{10}Q_{20}'$. A line $P_2U$ is drawn perpendicularly to a plane defined by lines $P_2P_3$ and $P_2Pe$, in which the line $P_2U$ is drawn in a direction of a vector product of vectors $P_2P_3$ and $P_2Pe$. The weaving pattern $Q_1Q_2'$ of the next step is obtained when line $Q_{10}Q_{20}'$ is turned about the axis of $P_2U$ in the direction from the line $P_2Pe$ to the line $P_2P_3$ through an angle $\angle P_3P_2Pe = \omega_0$.

The direction cosine $(\lambda, \mu, \nu)$ of the line $P_1P_2$ is determined by the coordinates of points $P_1(x_1, y_1, z_1)$ and $P_2(x_2, y_2, z_2)$, while the direction cosine $(\lambda', \mu', \nu')$ of the line $P_2P_3$ is determined by the coordinates of points $P_2(x_2, y_2, z_2)$ and $P_3(x_3, y_3, z_3)$. Accordingly, the angle $\omega_0$ is expressed by:

$$\omega_0 = f_{16}(\lambda, \mu, \nu, \lambda', \mu', \nu') \quad (24)$$

When the coordinates of the points $Q_1$, $Q_2'$ and $Q_3$ are $(x_1, y_1, z_1)$, $(x_2, y_2, z_2)$ and $(x_3, y_3, z_3)$, respectively, $Q_1$ is defined by the following equation:

$$x_1' = f_{17}(x_1, x_2, x_1, y_1, z_1, \omega_0, \lambda, \mu, \nu, \lambda', \mu', \nu')$$

$$y_1' = f_{18}(y_1, y_2, x_1, y_1, z_1, \omega_0, \lambda, \mu, \nu, \lambda', \mu', \nu')$$

$$z_1' = f_{19}(z_1, z_2, x_1, y_1, z_1, \omega_0, \lambda, \mu, \nu, \lambda', \mu', \nu') \quad (25)$$

$Q_2'(x_2', y_2', z_2')$ and $Q_3(x_3', y_3', z_3')$ also are obtained in the similar manner. The teaching of the weaving pattern and the amplitude is required to be effected only once with respect to the initial weld line. In the succeeding steps, the weaving is automatically continued along the respective correct directions by sequentially obtaining $Q_1$, $Q_2'$ and $Q_3$ and repeating the procedure described with reference to FIG. 5. Even if a step having an air-cut, where the weaving is interrupted, is included in the successive steps, above-mentioned computing is continued. Therefore, the teaching of weaving points $Q_1$, $Q_2$ and $Q_3$ is unnecessary in the weld line even after the air-cut. Namely, only one time of teaching of the weaving points $Q_1$, $Q_2$ and $Q_3$ is sufficient.

Figure 11:
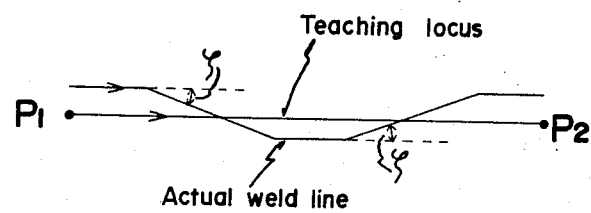
FIGS. 11 and 12 are explanatory views of the deviation angle between a teaching locus and an actual weld line.
Figure 12:
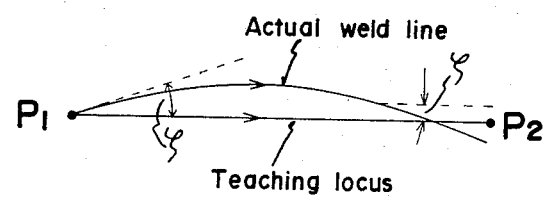

On profiling welding, a restriction is imposed on the angle of deviation of the actual weld line from the teaching locus within the same step between the teaching points $P_1$ and $P_2$ (FIGS. 11 and 12).

The permissible maximum limit $\zeta_{max}$ of the angle $\zeta$ of deviation is dependent on the weaving frequency h (Hz), the welding speed V (mm/min) and the amount of loci correction q (mm) or $\sqrt{2}q$ shown in FIG. 6:

$$\zeta_{max} = \tan^{-1}(120\, hq/V) \quad (26)$$

$$\zeta_{max} = \tan^{-1}(120\, \sqrt{2}hq/V) \quad (27)$$

When the angle of deviation is $\zeta_{max}$ or less, the profiling welding within the same step is allowed and the welding line is deemed essentially to have no inflection point. In this invention, however, $\zeta_{max}/2$ is determined to be the maximum limit of the angle of deviation within the same step. When h=2 Hz, q=0.7 mm and V=300 mm/min., $\zeta_{max}=30°$, hence $\zeta_{max}/2=15°$.

From the viewpoint of automatic welding techniques, generally, there will be no workpiece having an angle of deviation from the taught path as great as 15°. Therefore, the determination of $\zeta_{max}/2$ as the maximum limit of the angle of deviation within the same step will be reasonable.

FIG. 13 shows the behaviour of profiling welding at a sharp rectangular corner in the fillet welding. The welding torch advances while profiling along the actual welding line and the center of weaving reaches the point $P_2'$. The weaving direction between the points $P_1'$, and $P_2'$ is perpendicular to the direction of a vector $P_1P_2$.

When the fillet welding portion ends at the point $P_2'$, the welder starts to form beads on a flat plate. In this case, the robot continues the profiling welding operation along the flat plate on the basis of a vector $P_2'P_2'$ which is parallel to the vector $P_1P_2$ and the center of weaving advances in the direction of the maximum limit of angle of deviation $\zeta_{max}$ determined by the Equations (26) and (27).

FIG. 14 is an enlarged view illustrating in detail the behavior of the center of weaving in the vicinity of the point $P_2'$. The coordinates $(x_n, y_n, z_n)$ of the center of weaving given by Equation (15) before and after the correction mode are memorized at points 1, 1', 2, 2' .... The angle $\xi$ between the line $P_1P_2$ and the projection of a line $l_1$ connecting the coordinates $(x_{n-1}, y_{n-1}, z_{n-1})$ immediately before the start of a preceding correction mode and the coordinates $(x_n, y_n, z_n)$ immediately before the next correction mode on a plane defined by teaching lines $P_1P_2$ and $P_2P_3$ will be determined. The angle $\eta$ between the line $P_1P_2$ and the projection of a line $l_2$ connecting the coordinates $(x_n', y_n', z_n')$ immediately after the completion of the next correction mode and the coordinates $(x_{n-1}', y_{n-1}', z_{n-1}')$ immediately after the completion of the preceding correction mode on the plane defined by lines $P_1P_2$ and $P_2P_3$ also will be determined. Since the coordinates of points $P_1$, $P_2$, $P_3$, 1, 1', 2, 2' ... are known, the direction cosine $(a, b, c)$ of lines 1 2, 2 3, 3 4 ..., the direction cosine $(a', b', c')$ of 1' 2', 2' 3', ..., the direction cosine $(\lambda, \mu, \nu)$ of the line $P_1P_2$ and the direction cosine $(\lambda', \mu', \nu')$ of the line $P_2P_3$ can easily be determined. Thus the angles $\xi$ and $\eta$ are defined by:

$$\xi = f(\lambda, \mu, \nu, \lambda', \mu', \nu', a, b, c) \quad (28)$$

$$\eta = f(\lambda, \mu, \nu, \lambda', \mu', \nu', a', b', c') \quad (29)$$

The mean of the angles $\xi$ and $\eta$ is computed before and after every correction mode during the profiling welding operation. The computed means are memorized sequentially in accordance with FIFO method. The point $P_2''$ in FIG. 13 is recognized to be an inflection point when the means in the FIFO memory exceed $\zeta_{max}/2$ and approach the maximum limit of angle of deviation $\zeta_{max}$. Then, as explained with reference to FIG. 10, the weaving direction is changed into a direction perpendicular to the line $P_2P_3$. The profiling welding operation for the next step starts on the basis of a line having its starting point $P_2''$ and its ending point $P_3'$ determined by shifting the point $P_3$ by a vector of displacement $P_2 \rightarrow P_2''$.

However, since the center of weaving of the torch is still located on the flat plate and not on the fillet part, a correct fillet welding is effected after the center of weaving moves in a direction at an angle $\zeta_{max}$ to the line $P_2''P_3'$ and reaches the point $P_2'''$.

Since the mean of the angles $\xi$ and $\eta$ also becomes equal to the angle $\zeta_{max}$ after the inflection point recognition, it is necessary to provide an interlocking means to prevent the inflection point recognition at this stage.

In this case, the center of weaving overturns through points $P_2'$-$P_2''$-$P_2'''$. However, this overturn is not necessarily disadvantageous. The welding of a sharp corner naturally is difficult and in teaching a sharp corner in a robot having no profiling capability, the teaching locus often is overturned outside the weld line as shown in FIG. 15 in order to prevent an undercut.

Figure 15A:
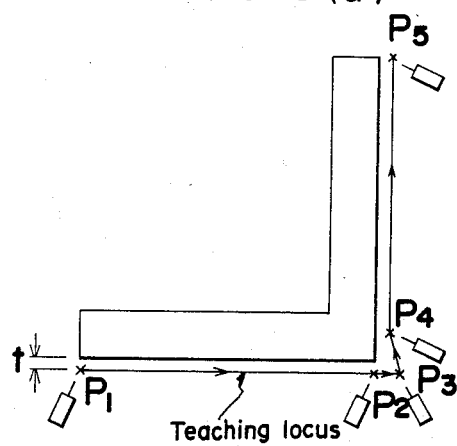
Figure 15B:
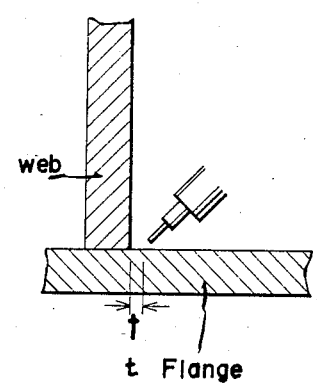

FIGS. 15a and 15b are a plan view and a side elevation of the teaching positions and the posture of the welding torch, respectively, in the fillet welding operation.

In the fillet welding operation, in which a comparatively large welding currents is required, it is usual to shift an aiming point of the welding torch to a flange side by a distance t to prevent an undercut in the web side, as shown in FIG. 15b. Since the undercut is liable to occur in the web side particularly in the sharp corner due to increased deposition of weld, the shifting of the aiming point is increased above the distance t in the sharp corner as shown in FIG. 15. Accordingly, this inflection point recognition method is reasonable.

Naturally, the profiling welding in accordance with the present invention is able to provide the distance (offset) t of FIG. 15 by offsetting the zero point of a transverse signal comparator (not shown) of a sensor circuit by applying a bias signal to the comparator.

Figure 16A:
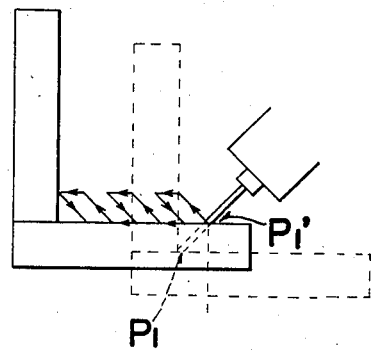
FIGS. 16A, 16B, 17A, and 17B are explanatory views of welding operation when the actual welding starting position is different from the teaching point.
Figure 16B:
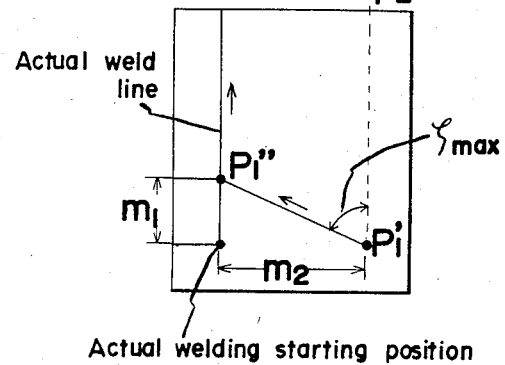
Figure 17A:
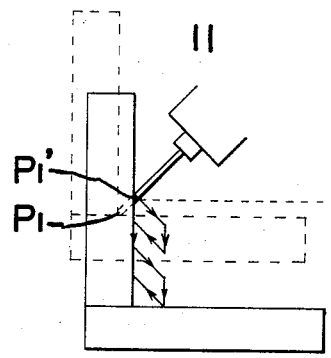
Figure 17B:
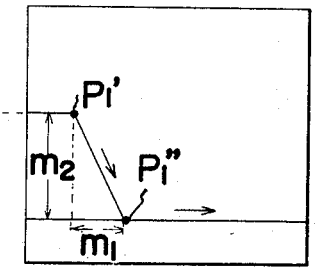

FIGS. 16 and 17 are views for explaining the welding starting position searching function for searching a welding starting position when the actual welding starting position is deviated greatly from the teaching welding starting position.

When a workpiece shown by solid lines is deviated diagonally upward with respect to the correct teaching position of the workpiece shown by dotted lines in FIG. 16, the actual welding starting point is not directed to a corner to be fillet-welded, but is above the flat plate. When the weaving for profiling welding is started from the welding starting position $P_1'$, the welding torch 11 is swung in the weaving direction (transverse direction) as explained with reference to FIG. 9 over the flat plate. Consequently, a difference in the welding current is produced between the right and the left laterally extreme positions of weaving. Therefore, the welding torch 11 approaches the point to be fillet-welded in the direction of the resultant vector of the leftward direction and the downward direction at the angle $\zeta_{max}$ with an effort of cancelling the current difference and adjusting the welding current to a fixed value, on the basis of a vector $P_1'P_2'$ which is parallel to the weld line, then starts a normal welding operation at the point $P_1''$.

In order to minimize a distance $m_1$ and to prevent an undesirable effect of unnecessary beads produced between the points $P_1'$ to $P_1''$ on the workpiece, the profiling welding between the points $P_1'$ to $P_1''$ is performed under a weaving condition and at a welding speed which are different from those of the welding along the weld line after the point $P_1''$. Namely, the welding speed V and the welding current are reduced drastically, the weaving frequency h is increased and the amount of locus correction q is increased to make the angle $\zeta_{max}$ of Equations (26) and (27) increase.

The method explained with reference to FIGS. 13 and 14 may be similarly applied to the recognition of the point $P_1''$. FIG. 17 shows the deviation of a workpiece in a reverse direction with respect to the direction of deviation of FIG. 16. The manner of profiling welding operation of FIG. 17 is entirely the same as that of FIG. 16.

Figure 18:
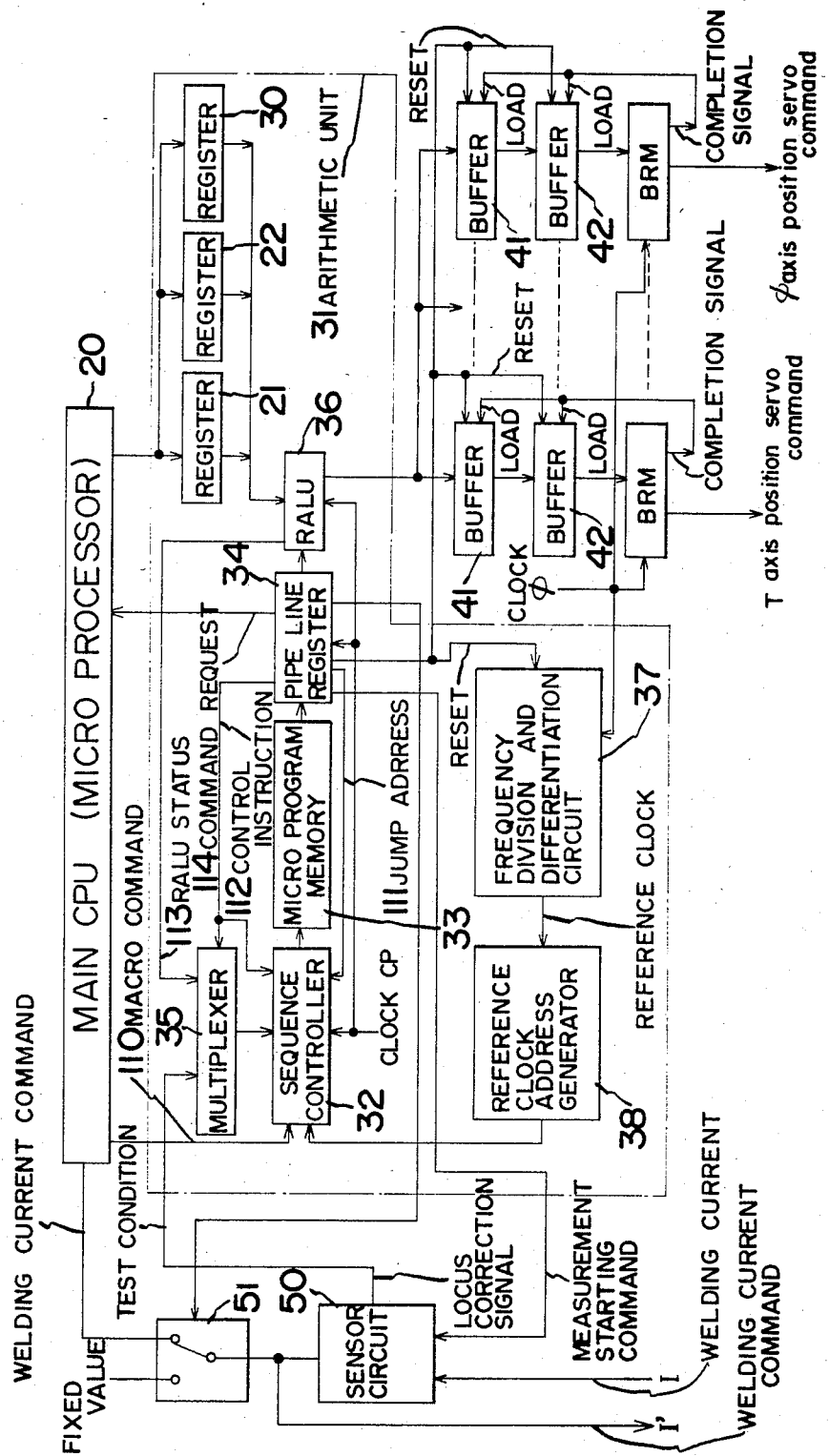
FIG. 18 is a block diagram of an embodiment of the control circuit in accordance with the present invention.

FIG. 18 is a block diagram showing the connection of (a) a profiling welding controller embodying the present invention and comprising an arithmetic unit and a BRM having a two-step buffer, (b) and a main CPU (a micro processor) for generally controlling the general robot operation, (c) a welding current commanding and changing switch and (d) the sensor circuit which has been described with reference to FIG. 8.

To effect the profiling welding operation through the general sequential robot motion, the main CPU 20 has functions to read out the following data, (a) the start position $P_1$ and the end position $P_2$ to be profiled, (b) the end position $P_3$ of succeeding step, (c) the weaving pattern defining positions $Q_1$, $Q_2$ and $Q_3$ and (d) the distance monitoring position $P_{20}$, which are specified in a teach box (not shown) as the pulse number from the original point of the robot three basic axes and the robot wrist axes, (e) the welding speed V, (f) the weaving frequency h and (g) the amount of locus correction q, from a memory unit (not shown) to set the data in registers 21 to 30 and to provide a macrocommand to start the profiling welding operation.

The arithmetic unit 31 comprises a sequence controller 32, a microprogram memory 33, a pipe line register 34, a multiplexer 35, a RALU (Register and Arithmetic Logical Unit 36), registers 21 to 30, a clock $\phi$ dividing and leading edge differentiating circuit 37 and a reference clock address generator 38.

The sequence controller 32 is an address controller which is capable of controlling the execution sequence of micro instructions stored in the memory 33 and is adapted to effect various addressing and stack control in response to the control instructions provided by the pipe line register 34.

More particularly, the sequence controller 32 controls, the selection of jump address which is given by the pipe line register 34 in the case of unconditional jump, the stack control at a micro subroutine call, the increment of the presently executed address, the selection of address specified by the macrocommand, the selection of address specified by the reference clock address generator 38 and the selection of the jump address which is given by the pipe line register 34 in the case of the conditional jump corresponding to the test conditions including RALU status.

Three kinds of input information for addressing are provided, which are the macrocommands from the CPU, the output of the reference clock address generator 38, and the output of the pipe line register 34.

According to a microprogram, namely, the control instruction of the pipe line register 34, it is decided that the sequence controller 32 selects which one of those three kinds of input information, or the sequence controller 32 selects none of them and the increment of the current address is effected.

Profiling welding control includes four macrocommands as follows:

(1) A command of arc start step immediately after the air cut and for effecting the inflection point recognition in accordance with the distance monitoring method.

(2) A command of arc start step immediately after the air cut and for effecting the inflection point recognition in accordance with the $(\xi+\eta)/2$ angle calculation method.

(3) A command of a step for continuously performing the welding operation after an arc start command has been given in the previous step and for effecting the inflection point recognition in accordance with the distance monitoring method.

(4) A command of a step for continuously performing welding operation after an arc start command has been given in the previous step and for effecting the inflection point recognition in accordance with the $(\xi+\eta)/2$ angle calculation method.

From the semantics of hardware, these macrocommands and the output of the reference clock address generator 38 are given in the form of indicating the first address of the respective processing microprograms. While these are not applied to the sequence controller, a jump address, a subroutine call address and a current address increment are given from the pipe line register 34.

The microprogram memory 33 is the essential unit of the arithmetic unit 31. All the arithmetic processing is executed in accordance with the instructions of the microprogram.

The pipe line register 34 is a buffer register of the microprogram memory 33.

The pipe line register 34 provides a microinstruction for calculation which is to be currently executed to the RALU 36 and also provides a control instruction for deciding the next microaddress to the sequence controller 32 and the multiplexer 35 and also a jump address, a subroutine call address and a current address increment to the sequence controller 32. When an inflection point is detected during the profiling welding operation, the pipe line register 34 applies a command request requesting the coordinates data of the next step to the main CPU 20.

The pipe line register 34 is provided for forming two signal paths, making such signal paths parallelly simultaneously progress, reducing the microcycle time and attaining the high-speed operation.

One of the paths is the path of a control method connecting the pipe line register 34→the sequence controller 32→the microprogram memory 33, while the other path is the path of the arithmetic method of the pipe line register 34→RALU 36. The pipe line register 34 if provided for parallelly actuating these two paths within the same clock cycle.

Since the next instruction of the microprogram prepared by the control path has already been provided at the input of the pipe line register 34 prior to the rising of the clock CP, the high-speed operation equivalent to an operation of zero memory fetch time can be attained.

The multiplexer 35 gives the sequence controller 32 eight test conditions of locus correction signals shown in FIG. 6 from the sensor and the RALU status corresponding to the control instruction of the pipe line register 34. And the multiplexer 34 causes a conditional jump to the respective processing program.

The RALU 36 comprises a logical-arithmetic calculation unit and a programmable register and is adapted to execute the operation instruction specified by the microprogram. Incremental pulse number of each drive axis of the robot at every reference clock, which is the result of the calculation, is stored in the predetermined register included in the RALU 36.

Registers 21, 22, 23, 24, 25, 26, and 27 store the pulse numbers of the robot three basic axes and the robot wrist axis from the original point of the starting position $P_1$, the ending position $P_2$, the position $P_3$, the position $Q_1$, the position $Q_2$, the position $Q_3$ and the point $P_{20}$, respectively.

The registers 28, 29 and 30 store the profiling welding speed V, the weaving frequency h and the amount of locus correction q, respectively. A buffer 41 is a register for storing an increment pulse number which is to be distributed lin the next reference clock of each drive axis of the robot. A buffer 42 is a register for storing the increment pulse number being currently distributed.

The BRM uniformly and evenly distributes the pulse by the number stored in the buffer 42 in pulses which are synchronous with the clock $\phi$ within the reference clock period and provides a distribution completion signal for buffer transfer at every reference clock.

The dividing-leading edge differentiating circuit produces a reference clock which is divided by the bit number of the BRM from the clock $\phi$ and differentiates the leading edge of the reference clock by synchronizing the BRM distribution completion signal and the reference clock.

Although the main CPU 20 gives a welding current command to the welding equipment and the sensor circuit 50, the welding current command selecting switch 51 is changed by the output of the arithmetic unit in 31 in detecting welding start position so that a fixed value is selected and when the welding start position is detected, the welding current command selecting switch 51 is changed to the side of the commanded value of the main CPU20.

Figure 19:
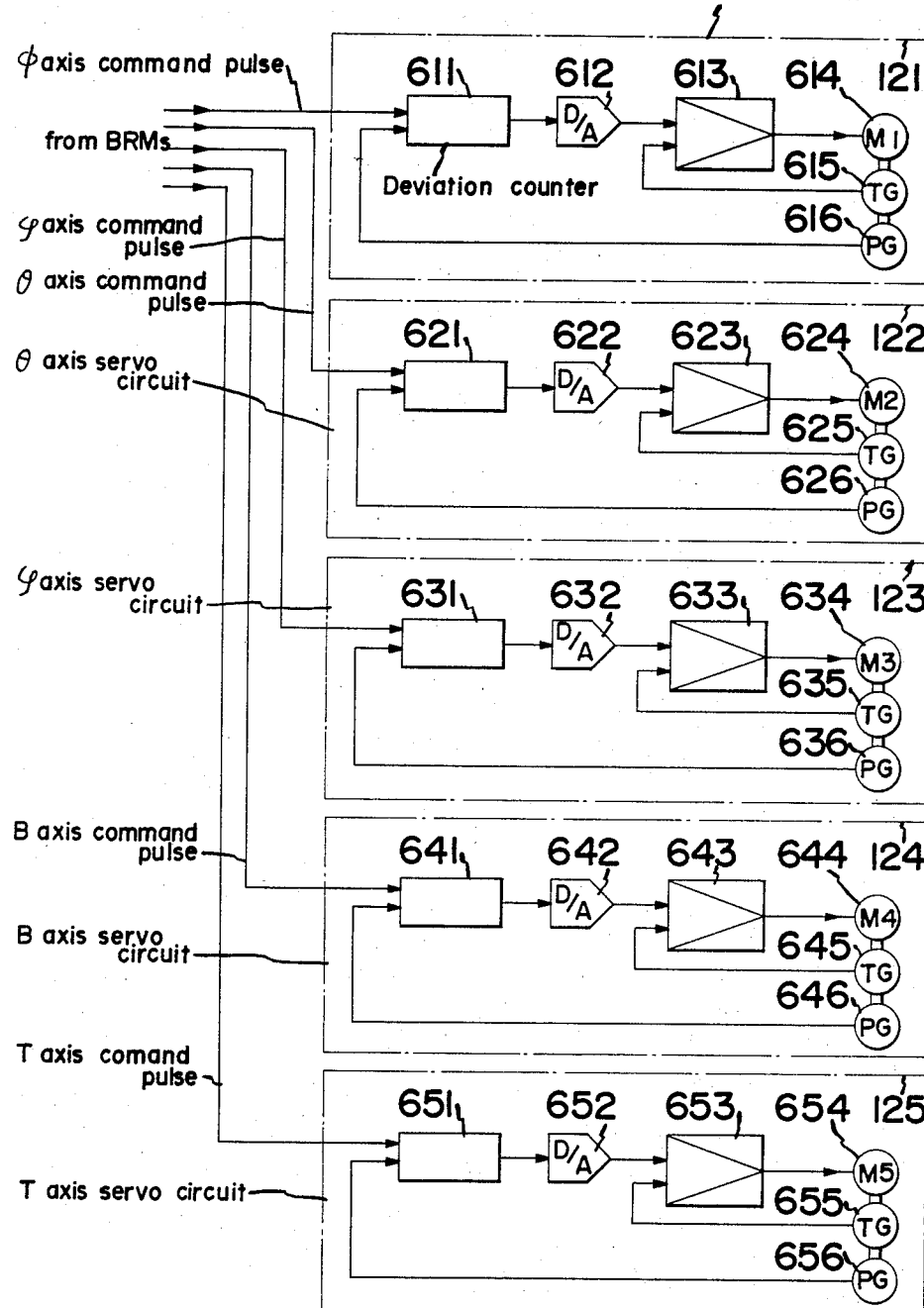
FIG. 19 is a block diagram of an embodiment of the servo-control unit in accordance with the present invention.

FIG. 19 shows the positioning servocircuits for the three basic axes ($\psi$-axis, $\theta$-axis, $\phi$-axis) and the two wrist axes (shaft B, shaft T) of an articulated robot which is controlled by the command pulses distributed from the BRM explained with reference to FIG. 18.

Differences between the respective command pulses of the axes which are given to cause the welding torch to perform the profiling welding operation while performing the weaving motion, and feedback pulses provided by the pulse generators 616, 626, 636, 646, and 656, are provided by deviation counters 611, 621, 631, 641, and 651, then analog speed commands are applied to servo-amplifiers 613, 623, 633, 643, and 653 through D/A converters 612, 622, 632, 642 and 652, respectively. The servo-amplifiers compare the speed commands with the output signals (detected speeds) of tachogenerators 615, 625, 635, 645, and 655, respectively, and control the corresponding drive motors so as to cancel the differences between the speed commands and the output signals of the tachogenerators. By means of these positioning servo circuits, the welding torch tip of the robot performs the desired profiling welding operation.

The manner of profiling welding control operation of the control circuit of FIG. 18 is explained below.

Initially, the arithmetic unit 31 executes a wait routine.

Since the wait routine includes a command to reset the reference clock dividing circuit 37, no reference clock is generated.

Prior to starting profiling welding control, the main CPU 20 first sets the coordinates of the starting point $P_1$ ($\psi_1$, $\theta_1$, $\phi_1$, $T_1$, $B_1$) of a profiling welding step, the ending point $P_2$ ($\psi_2$, $\theta_2$, $\phi_2$, $T_2$, $B_2$) of the step, the ending point $P_3$ ($\psi_3$, $\theta_3$, $\phi_3$, $T_3$, $B_3$) of the next step, weaving pattern defining points $Q_1$ ($\psi_1$, $\theta_1$, $\phi_1$, $T_1$, $B_1$), $Q_2$ ($\psi_2$, $\theta_2$, $\phi_2$, $T_2$, $B_2$) and $Q_3$ ($\psi_3$, $\theta_3$, $\phi_3$, $T_3$, $B_3$) in the registers 21 to 26.

The main CPU 20 also sets a profiling welding speed V, a weaving frequency h and the amount of locus correction q in the registers 28 to 30. When the distance monitoring method is employed for the inflection point recognition, the main CPU 20 sets the coordinates of the monitoring point $P_{20}$ ($\psi_{20}$, $\theta_{20}$, $\phi_{20}$, $T_{20}$, $B_{20}$) in the register 27.

When one of those four macrocommands is provided by the main CPU 20, the first addresses of the respective corresponding service microprograms are selected. Those four service programs set a welding starting point detecting flag (not shown) to 1 when the step includes the welding starting point detection, or reset to 0 when the step does not include the welding starting point detection, set a inflection point detecting flag (not shown) to 1 when the distance monitoring method is employed for inflection point detection, reset the inflection point detecting flage to 0 when the ($\xi+\eta$)/2 calculating method is employed, then proceeds into a profiling welding processing program (first address N+). Since those four programs include a cancellation instruction to reset the reset signal of the reference clock dividing circuit 37, the dividing circuit 37 starts counting clock $\phi$. Then, the sequence controller 32 operates to perform an addressing which is necessary for arithmetic processing until an output signal is provided by the next reference clock address generator 38.

Now, the profiling welding processing program which starts with N+ address will be described hereinafter.

Since profiling welding is started from a step including an arc start, initially, the welding starting point flag is set to 1. Consequently, the welding speed V, the weaving frequency h and the amount of locus correction q which are set in the registers 28 to 30 are not used before the profiling welding operation reaches the normal welding starting position, but fixed values memorized in the arithmetic unit 31 are used. The welding current command selecting switch 51 is changed by the output of the arithmetic unit 31 so as to apply fixed values of the welding current command to the welding equipment and the sensor circuit 50.

The positions $P_1$, $P_2$, $P_3$, $Q_1$, $Q_2$ and $Q_3$, which are set in the registers, are converted to the data of the orthogonal coordinates represented by Equation (1) by using Equation (21). When the inflection point detecting flag is 1, the point $P_{20}$ is converted into $P_{20}(\bar{x}_{20}, \bar{y}_{20}, \bar{z}_{20})$ by using Equation (21).

Then, Equations (4) and (5) are solved by using the fixed value of the weaving frequency h which is memorized in the arithmetic unit 31. Equation (11) is solved by using the fixed value of the welding speed V. Equations (2), (3) and (7) are solved successively.

Equation (19) is solved by using the wrist axis angle at points $P_1$ and $P_2$. The first address storing the processing programs after this is assumed to be M+.

At the first reference clock for starting profiling welding, the welding torch is still positioned on the center of weaving, therefore, no locus correction signal is generated. In this stage, Equations (8) to (10), (13) and (14) do not participate in the operation and the arithmetic unit 31 is in the parallel shifting mode.

At the first reference book, Equation (6) is solved with N=1. Since K'=0, Equation (16) provides K=1. Using Equations (12), (15) and (7), $X_n$, $Y_n$ and $Z_n$ of Equation (17) are determined. $B_n$ and $T_n$ are obtained from Equation (20).

The differences $\Delta B$ and $\Delta T$ between the solution $B_n$ and $T_n$ of Equation (20) and the values of $B_n$ and $T_n$ at the preceding reference clock (now $\bar{B}_1$ and $\bar{T}_1$) are set in the predetermined register of the RALU 36.

The values of $\psi_n$, $\theta_n$ and $\phi_n$ of the three basic axes are obtained by introducing the solutions $X_n$, $Y_n$ and $Z_n$ of Equation (17) and $B_n$ and $T_n$ into Equation (22) and then, the differences $\Delta\psi$, $\Delta\theta$ and $\Delta\phi$ between $\psi_n$, $\theta_n$ and $\phi_n$ and the values of $\psi_n$, $\theta_n$ and $\phi_n$ (now $\psi_1$, $\theta_1$ and $\phi_1$) at the preceding reference clock as set in the predetermined register of RALU 36.

When the inflection point detecting flag is 1, the computed result of Equation (18) is set in the predetermined register of RALU 36 and the arithmetic unit 31 stands by.

This standby is different from the wait routine waiting for the macrocommand which is provided by the main CPU 20, but is a routine waiting for the next reference clock address generator output M+ and the dividing circuit 37 will not be reset.

Since the clock $\phi$ and the bit number of the BRM are set so as to provide a reference clock period which is longer than a time required for completing the operations as hereinbefore described, the shortage of the operating time will not occur.

While the arithmetic unit 31 is executing the wait routine for waiting M+, the BRM provides a distribution completion signal simultaneously with the generation of a reference clock, the predetermined register of the RALU 36 loads the five buffers 41 with the values of $\Delta\psi$, $\Delta\theta$, $\Delta\phi$, $\Delta B$ and $\Delta T$, respectively, and the buffers 42 are loaded with the contents of the buffers 41.

At the first reference clock, the buffers 41 remain cleared, therefore, 0 is loaded in the buffers 42 so that the BRM does not distribute pulses. This reference clock actuates the reference clock address generator 38 and the execution of the microprogram is started form M+ and Equation (6) is determined by introducing N=2 into the equation.

Since j' of Equation (23) at the preceding reference clock is not j, no locus correction signal is generated so that the arithmetic unit 31, and the parallel shifting mode. Consequently, K'=0 and from Equation (16), K=2.

Then, the values of $X_n$, $Y_n$ and $Z_n$ of Equation (17) are determined by using Equations (12) and (15). The values of $B_n$ and $T_n$ also are determined by using Equation (20). The differences $\Delta B$ and $\Delta T$ between the values of the instant $B_n$ and $T_n$ and the values of the preceding $B_n$ and $T_n$ are set in the predetermined register of the RALU 36. The values of $\psi_n$, $\theta_n$ and $\phi_n$ are determined by introducing $X_n$, $Y_n$, $Z_n$, $B_n$ and $T_n$ into Equation (22). The differences $\Delta\psi$, $\Delta\theta$ and $\Delta\phi$ between the respective values of $\psi_n$, $\theta_n$ and $\phi_n$ at the instant and the preceding reference clock are set in the predetermined register of the RALU 36. The computed result of Equation (18) is compared with the preceding value stored in the RALU 36 and when the instant value is smaller than the preceding one, the preceding value is replaced by the instant value.

After this, the arithmetic unit 31 stands by and waits for the next refereance clock generator output M+.

At the next reference clock, the contents of the buffers 41 at the preceding reference clock are loaded in the buffers 42, while the buffers 41 are loaded with the $\Delta\psi$, $\Delta\theta$, $\Delta\phi$, $\Delta T$ and $\Delta B$ at the present reference clock, respectively and the BRM distributes a command pulse to the respective axis positioning servocircuits. This operation is repeated until the j' of Equation (23) becomes j. When j'=j, the coordinates $x_n$, $y_n$ and $z_n$ of the center of weaving determined by Equation (15) are memorized and a measurement start command is applied to the sensor circuit 50, then the arithmetic unit 31 is changed into the locus correction mode at the next reference clock. Transverse and vertical locus correction signals produced by the sensor circuit 50 are received by M+ as test condition. Equations (8), (10) and (13) are solved by using the values of $\alpha$, $\beta$, $\gamma$, $\lambda$, $\mu$ and $\nu$, which have previously been computed, a fixed value of q which is memorized in the arithmetic unit 31 and the fixed value of $\gamma$. Equation (14) is computed with K'=1. The coordinates of the center of weaving $(x_n', y_n', z_n')$ determined by solving Equation (15) by employing the value of K at the preceding reference clock are memorized. Equation (6) is solved with N=K+K'. The solution of Equation (17), i.e. $X_n$, $Y_n$ and $Z_n$ are determined. $B_n$ and $T_n$ are determined and are converted into $\Delta\psi$, $\Delta\theta$, $\Delta\phi$, $\Delta T$ and $\Delta B$, which are stored in the predetermined register of RALU 36. Thus the BRM performs positioning servocontrol.

Equation (18) is computed for renewal.

Then, the arithmetic unit 31 is changed into the parallel shifting mode again, determines the values of $\psi_n$, $\theta_n$, $\phi_n$, $T_n$ and $B_n$ at every reference clock and performs positioning servocontrol on the basis of the differences $\Delta\psi$, $\Delta\theta$, $\Delta\phi$, $\Delta T$ and $\Delta B$, which are differences between the values of $\psi_n$, $\theta_n$, $\phi_n$, $T_n$ and $B_n$ at the present and the preceding reference clocks. Equation (18) is also computed at every reference clock to save the minimum value. The parallel shifting mode is continued until j'=j again. When j'=j again, the direction cosine (a, b, c) of a line connecting the coordinates $(x_n, y_n, z_n)$ determined by Equation (15) and the coordinates $(x_{n-1}, y_{n-1}, z_{n-1})$ determined and memorized at the preceding reference clock is determined on the basis of the coordinates $x_n$, $y_n$, $z_n$, $x_{n-1}$, $y_{n-1}$ and $z_{n-1}$, the direction cosine $(\lambda', \mu', \nu')$ of $P_2P_3$ is determined on the basis of the coordinates of point $P_2(\bar{x}_2, \bar{y}_2, \bar{z}_2)$ and point $P_3(\bar{x}_3, \bar{y}_3, \bar{z}_3)$ and then, the value of $\xi$ is computed by Equation (28) by using those direction cosines and the direction cosine of $P_1P_2$ which has previously been determined by Equation (2). The computed value of $\xi$ is memorized in the FIFO (First In First Out).

The values of $x_n$, $y_n$ and $z_n$ memorized at the preceding reference clock are replaced by those obtained at the present reference clock. The measurement start command is given to the sensor circuit 50, then the arithmetic unit 31 is changed to the locus correction mode at the next reference clock. Equations (8), (10) and (13) are solved in response to the generation of locus correction signals of the sensor circuit 50. Equation (14) is solved by assuming K'=2 and Equation (15) is solved with the value of K obtained at the preceding reference clock to determine the coordinates $(x_n', y_n', z_n')$ of the center of weaving. The value of Equation (29) is computed by using the direction cosine $(a', b', c')$ of a line connecting the coordinates $(x_n', y_n', z_n')$ and the coordinates $(x_{n-1}', y_{n-1}', z_{n-1}')$ memorized at the preceding reference clock and the previously determined direction cosines $(\lambda, \mu, \nu)$ and $(\lambda', \mu', \nu')$. The computed value of $\eta$ is memorized in FIFO. The values of $x_n'$, $y_n'$ and $z_n'$ determined at the preceding reference clock is replaced with those determined at the present reference clock. Equation (6) is solved by assuming N=K+K'. The solutions $X_n$, $Y_n$ and $Z_n$ of Equation (17) are determined. The values of $B_n$ and $T_n$ are determined and converted into $\Delta\psi$, $\Delta\theta$, $\Delta\phi$, $\Delta T$ and $\Delta B$, which are set in the predetermined register of the RALU 36 so that the BRM performs positioning servocontrol.

Equation (18) is computed and the value is renewed. Thus the parallel shifting mode is completed and after this, a cycle of the parallel shifting mode-locus correction mode is repeated.

Before and after the locus correction mode, the means of $(\xi+\eta)/2$ memorized in the FIFO memory is examined whether it is exceeding the half of $\zeta_{max}$ determined by Equation (26) or (27) and approaching the value of $\zeta_{max}$.

When the mean value is close to the value of $\zeta_{max}$, it is recognized that the welding starting position is still not being detected and the profiling welding operation is continued with the fixed values of V, h and q and the welding current command selecting switch 51 switched to the side of the fixed value.

When the means value of $(\xi+\eta)/2$ decreases to a value below $\zeta_{max}/2$, it is recognized that the center of weaving reaches the welding starting position, then the welding current command selecting switch 51 is changed by the output of the arithmetic unit 31 so as to select the welding current instructed by the main CPU 20, changes the values of V, h and q to the respective values which are set in the registers 28 to 30, newly determines the amount of segment of weaving at one reference clock $\Delta x$, $\Delta y$, $\Delta z$ by solving Equations (4) and (5), newly determining the values of $\bar{x}_{n0}$, $\bar{y}_{n0}$ and $\bar{z}_{n0}$ of Equation (11) and applies the value of q set in the register 30 for the computation of Equation (10). The value of $\zeta_{max}$ of Equations (26) and (27) is also newly computed.

After this, the minimum value of Equation (18) is renewed when the inflection point detecting flag is 1, the value of $\xi$ and $\eta$ are saved sequentially in the FIFO memory when the inflection point detecting flag is 0 and the profiling welding operation is continued.

When the inflection point detecting flag is 1, it is determined that the center of weaving has reached the ending position of the step when the minimum value of Equation (18) reduces over a width of variation. When the inflection point detecting flag is 0, it is determined that the center of weaving has reached the ending position when the mean value of $(\xi+\eta)/2$ memorized in the FIFO memory is $\zeta_{max}/2$ or greater and approaches to $\zeta_{max}$.

After the detection of an inflection point has been completed, the arithmetic unit 31 decides the direction of weaving in the next step and executes the weaving pattern continuation processing to provide the same weaving amplitude as that of the preceding step. More specifically, the value of $\omega_0$ of Equation (24) is determined from the direction cosine $(\lambda, \mu, \nu)$ of $P_1P_2$ and the direction cosine $(\lambda', \mu', \nu')$ of $P_2P_3$, which have previously been determined in the preceding step and the coordinates $(x_1', y_1', z_1')$ of the position $Q_1$ of the next step, namely, the position $\bar{Q}_1$ explained with reference to FIG. 10 are determined from Equation (25). Similarly, the coordinates of positions $\bar{Q}_2$ and $\bar{Q}_3$ are determined to replace the coordinates of positions $Q_1$, $Q_2$ and $Q_3$ of Equation (1).

The position of the center of weaving at the detection of the inflection point is the starting position for the next step. The differences $i_1=(x_n-\bar{x}_2)$, $i_2=(y_n-\bar{y}_2)$ and $i_3=(z_n-\bar{z}_2)$ between those $(x_n, y_n, z_n)$ and the position $P_2(\bar{x}_2, \bar{y}_2, \bar{z}_2)$ are memorized and the values of $\bar{x}_n$, $\bar{y}_n$ and $\bar{z}_n$ are made to represent the coordinates data $\bar{x}_2$, $\bar{y}_2$ and $\bar{z}_2$ of $P_1$ of Equation (1).

After this, with respect to the command request 114 from the arithmetic unit 31, the main CPU 20 sets the pulse numbers from the origin of the five axes of the robot of the ending position of the next step in the register 22 and after setting the pulse numbers from the origin of the five axes of the robot of the ending positions of the successive step and the distance monitoring points of the successive step in the registers 23 and 27, the main CPU 20 gives the macrocommand to the arithmetic unit 31. This macrocommand does not include the welding starting position detection.

The arithmetic unit 31 converts the coordinates $(\psi_2, \theta_2, \phi_2, \bar{T}_2, \bar{B}_2)$ of the new ending position $P_2$ of the step set in the register 22, the coordinates $(\psi_3, \theta_3, \phi_3, \bar{T}_3, \bar{B}_3)$ of the new ending position $P_3$ of the next step set in the register 23 and the coordinates $(\psi_{20}, \theta_{20}, \phi_{20}, \bar{T}_{20}, \bar{B}_{20})$ of the new distance monitoring point $P_{20}$ set in the register 27 into coordinates $P_2(\bar{x}_2, \bar{y}_2, \bar{z}_2)$, $P_3(\bar{x}_3, \bar{y}_3, \bar{z}_3)$ and $P_{20}(\bar{x}_{20}, \bar{y}_{20}, \bar{z}_{20})$ by means of Equation (21). Coordinates obtained by shifting the coordinates $P_2(\bar{x}_2, \bar{y}_2, \bar{z}_2)$ by the amount of memorized $i_1$, $i_2$ and $i_3$ are the coordinates of the new ending position. That is, the new ending position $P_2(\bar{x}_2, \bar{y}_2, \bar{z}_2)$ is determined through conversions $\bar{x}_2+i_1\rightarrow\bar{x}_2$, $\bar{y}_2+i_2\rightarrow\bar{y}_2$ and $\bar{z}_2+i_3\rightarrow\bar{z}_3$. The manner of profiling welding operation after this entirely the same with that in the preceding step, except that the detection of welding starting position is not performed.

Since the next data is continously supplied to the buffers 41 while the two-step buffer distributes the command pulses, the profiling welding operation is not interrupted at inflection points so that smooth profiling welding is attained.

As has been described hereinbefore, the profiling welding method in accordance with the present invention is capable of attaining an automatic welding with workpieces of poor accuracy and has advantages as follows:

(1) Since nothing except a welding torch is mountd on the robot wrist, profiling welding can be attained in a very narrow space as the torch can enter the space.

(2) The welding starting position can be detected even if the actual welding line of a workpiece is deviated from the teaching locus due to the poor accuracy of the workpiece without the need of a form recognition method such as an expensive vision method.

(3) The welding of inflection points of any shape can be attained smoothly and correctly through the profiling welding without the need of a form recognition method and furthermore, a correct welding can be attained even if the inflection points vary widely between workpieces.

(4) Since the welding line of a workpiece included within a profiling welding angle which is dependent on the set values of the weaving frequency, the welding speed and the amount of locus correction, can be included within a same step, the initial teaching operation is simplified and the accessibility is improved.

(5) Since it is sufficient to teach three points for defining the weaving pattern only to the first welding step owing to the automatic weaving pattern continuation function of the method, teaching operation is facilitated.

(6) Since the sensing information is acquired from the arc phenomenon itself (welding current, welding voltage) instead of employing a particular sensor which is to be mounted on the robot wrist, the profiling welding method in accordance with the present invention is free from problems inherent in other ordinary sensors irrespective of their types, contact type or non-contact type, such as hindering welding operation by the sensor, having a dead angle of sensing and having insufficient reliability in the sensor under unfavorable operating conditions such as welding heat, spatters and fume.

According to the present invention, automatic welding operation embodying a welding robot is feasible even if the workpieces are inaccurately formed, if the workpiece is deviated from the correct position or if the weld line is wavy. Thus the present invention greatly contributes to automating the welding operation.

Although in the exemplary robot as shown in FIG. 3, both the weaving motion control as well as the locus correction control are attained through controlling the three axes of the robot, naturally, modifications in the design of the control method are possible, in which the weaving motion and the locus correction are separately controlled, namely, an actuator may be provided on the robot wrist independently of the drive axes of the robot for exclusively controlling the weaving motion and only the locus correction control may be effected by means of the three basic axes of the robot.

What is claimed is:

1. A welding robot controlling method for controlling a welding robot having a welding torch guided toward a teaching direction and a sensor which intermittently generates a locus correction signal for the tip of said welding torch, comprising (1) giving said locus correction signal as a resultant vector of an arbitrary number of two-dimensional vectors on a plane which intersects a welding line direction, (2) correcting a locus of said tip of said welding torch by controlling three basic axes of said robot in a direction of a resultant vector composed of a correction vector representing said locus correction signal and a vector (hereinafter called r vector) which, through a position of said tip of said welding torch, has a direction vector parallel to a line connecting two teaching points, and has a predetermined length, when said locus correction signal is generated, and (3) controlling said three basic axes of said robot such that said tip of said welding torch moves on a line which is parallel to said line connecting said two teaching points and passes through a position of said tip of said welding torch immediately after completion of said locus correction, until a subsequent locus correction signal is given after completion of said locus correction.

2. A welding robot controlling method according to claim 1, wherein said locus correction signal is given as a resultant vector of an arbitrary number of two-dimensional vectors on a plane which intersects the welding line direction at a right angle.

3. A welding robot controlling method according to claim 1 or 2, wherein said two-dimensional vector is a vector in an axial direction of said welding torch.

4. A welding robot controlling method according to claim 1 or 2, wherein said two-dimensional vector is a vector in a perpendicular direction with respect to an axial direction of said welding torch.

5. A welding robot controlling method according to claim 1 or 2, wherein said arbitrary number of two-dimensional vectors consist of a vector in an axial direction of said welding torch and a vector in a perpendicular direction with respect to the axial direction of said welding torch.

6. A welding robot controlling method according to claim 5 wherein said arbitrary number of two-dimensional vectors consist of two two-dimensional vectors represented respectively by a binary quantity.

7. A welding robot controlling method according to claim 1 or 2, wherein said arbitrary number of two-dimensional vectors consist of two two-dimensional vectors represented respectively by a binary quantity.

8. A welding robot controlling method according to claim 1 or 2, wherein a projecting component of the speed of said tip of said welding torch onto said r vector is controlled such that said projecting speed becomes a desired welding speed.

9. A welding robot controlling method for controlling a welding robot having a welding torch guided toward a teaching direction and a sensor which intermittently generates a locus correction signal for the tip of said welding torch, comprising (1) providing a weaving motion of said tip of said welding torch by controlling the movements of three basic axes of said welding robot, (2) giving said locus correction signal as a resultant vector of an arbitrary number of two-dimensional vectors on a plane which intersects a welding line direction, (3) correcting a locus of the center of said weaving motion by controlling three basic axes of said robot in a direction of a resultant vector composed of a correction vector representing said locus correction signal and a vector (hereinafter called r vector) which, through a position of said tip of said welding torch, has a direction vector parallel to a line connecting two teaching points, and has a predetermined length, when said locus correction signal is generated, and (4) controlling said three basic axes of said robot such that said center of said weaving motion moves on a line which is parallel to said line connecting said two teaching points and passes through a position of said tip of said welding torch immediately after completion of said locus correction, until a subsequent locus correction signal is given after completion of said locus correction.

10. A welding robot controlling method according to claim 9, wherein said locus correction signal is given as a resultant vector of an arbitrary number of two-dimensional vectors on a plane which intersects the welding line direction at a right angle.

11. A welding robot controlling method according to claim 9 or 10, wherein said two-dimensional vector is a vector in an axial direction of said welding torch at the center of said weaving motion.

12. A welding robot controlling method according to claim 9 or 10, wherein said two-dimensional vector is a vector in a direction of said weaving motion of said welding torch.

13. A welding robot controlling method according to claim 9 or 10, wherein said arbitrary number of two-dimensional vectors consist of a vector in an axial direction of said welding torch at the center of said weaving motion and a vector in a perpendicular direction with respect to the axial direction of said welding torch.

14. A welding robot controlling method according to claim 13 wherein said arbitrary number of two-dimensional vectors consist of two two-dimensional vectors represented respectively by a binary quantity.

15. A welding robot controlling method according to claim 9 or 10, wherein said arbitrary number of two-dimensional vectors consist of a vector in a direction of said weaving motion of said welding torch and a vector in a perpendicular direction with respect to said weaving motion.

16. A welding robot controlling method according to claim 15 wherein said arbitrary number of two-dimensional vectors consist of two two-dimensional vectors represented respectively by a binary quantity.

17. A welding robot controlling method according to claim 9 or 10, wherein said arbitrary number of two-dimensional vectors consist of two two-dimensional vectors represented respectively by a binary quantity.

18. A welding robot controlling method according to claim 9 or 10, wherein a projecting component of the speed of said tip of said welding torch onto said r vector at said center of weaving is controlled such that said projecting speed becomes a desired welding speed.

19. A welding robot controlling method for controlling a welding robot having a welding torch guided toward a teaching direction and a sensor which intermittently generates a locus correction signal for the tip of said welding torch, comprising (1) providing a weaving motion of said tip of said welding torch by controlling the movements of three basic axes of said welding robot, (2) generating said locus correction signal by a change of a welding current at both laterally extreme positions of said weaving motion, (3) giving said locus correction signal as a resultant vector of an arbitrary number of two-dimensional vectors on a plane which intersects a welding line direction, (4) correcting a locus of the center of said weaving motion by controlling the three basic axes of said robot in a direction of a resultant vector composed of a correction vector representing said locus correction signal and a vector (hereinafter called r vector) which, through a position of said tip of said welding torch, has a direction vector parallel to a line connecting two teaching points, and has a predetermined length, when said locus correction signal is generated, and (5) controlling said three basic axes of said robot such that said center of said weaving motion moves on a line which is parallel to said line connecting said two teaching points and passes through a position of said tip of said welding torch immediately after completion of said locus correction, until a subsequent locus correction signal is given after completion of said locus correction.

20. A welding robot controlling method according to claim 19, wherein said locus correction signal is given as a resultant vector of an arbitrary number of two-dimensional vectors on a plane which intersects the welding line direction at a right angle.

21. A welding robot controlling method according to claim 19 or 20, wherein said two-dimensional vector is a vector in an axial direction of said welding torch at the center of said weaving motion.

22. A welding robot controlling method according to claim 19 or 20, wherein said two-dimensional vector is a vector in a direction of said weaving motion of said welding torch.

23. A welding robot controlling method according to claim 19 or 20, wherein said arbitrary number of two-dimensional vectors consist of a vector in an axial direction of said welding torch at the center of said weaving motion and a vector in a perpendicular direction with respect to the axial direction of said welding torch.

24. A welding robot controlling method according to claim 23 wherein said arbitrary number of two-dimensional vectors consist of two-dimensional vectors represented respectively by a binary quantity.

25. A welding robot controlling method according to claim 19 or 20, wherein said arbitrary number of two-dimensional vectors consist of a vector in the direction of said weaving motion of said welding torch and a vector in a perpendicular direction with respect to said weaving motion.

26. A welding robot controlling method according to claim 25 wherein said arbitrary number of two-dimensional vectors consist of two two-dimensional vectors represented respectively by a binary quantity.

27. A welding robot controlling method according to claim 19 or 20, wherein said arbitrary number of two-dimensional vectors consist of two two-dimensional vectors represented respectively by a binary quantity.

28. A welding robot controlling method according to claim 19 or 20, wherein a projecting component of the speed of said tip of said welding torch onto said r vector at said center of weaving is controlled such that said projecting speed becomes a desired welding speed.

29. A welding robot controlling method for controlling a welding robot having a welding torch guided toward a teaching direction and a sensor which intermittently generates a locus correction signal for the tip of said welding torch, comprising (1) providing a weaving motion of said tip of said welding torch by controlling the movements of three basic axes of said welding robot, (2) generating said locus correction signal by a change of a welding voltage at both laterally extreme positions of said weaving motion, (3) giving said locus correction signal as a resultant vector of an arbitrary number of two-dimensional vectors on a plane which intersects a welding line direction, (4) correcting a locus of the center of said weaving motion by controlling the three basic axes of said robot in a direction of a resultant vector composed of a correction vector representing said locus correction signal and a vector (hereinafter called r vector) which, through a position of said tip of said welding torch, has a direction vector parallel to a line connecting two teaching points, and has a predetermined length, when said locus correction signal is generated, and (5) controlling said three basic axes of said robot such that said center of said weaving motion moves on a line which is parallel to said line connecting said two teaching points and passes through a position of said tip of said welding torch immediately after completion of said locus correction, until a subsequent locus correction signal is given after completion of said locus correction.

30. A welding robot controlling method according to claim 29, wherein said locus correction signal is given as a resultant vector of an arbitrary number of two-dimensional vectors on a plane which intersects the welding line direction at a right angle.

31. A welding robot controlling method according to claim 29 or 30, wherein said two-dimensional vector is a vector in an axial direction of said welding torch at the center of said weaving motion.

32. A welding robot controlling method according to claim 29 or 30, wherein said two-dimensional vector is a vector in the direction of said weaving motion of said welding torch.

33. A welding robot controlling method according to claim 29 or 30, wherein said arbitrary number of two-dimensional vectors consist of a vector in an axial direction of said welding torch at the center of said weaving motion and a vector in a perpendicular direction with respect to the axial direction of said welding torch.

34. A welding robot controlling method according to claim 33 wherein said arbitrary number of two-dimensional vectors consist of two two-dimensional vectors represented respectively by a binary quantity.

35. A welding robot controlling method according to claim 29 or 30, wherein said arbitrary number of two-dimensional vectors consist of a vector in the direction of said weaving motion of said welding torch and a vector in a perpendicular direction with respect to said weaving motion.

36. A welding robot controlling method according to claim 35 wherein said arbitrary number of two-dimensional vectors consist of two two-dimensional vectors represented respectively by a binary quantity.

37. A welding robot controlling method according to claim 29 or 30, wherein said arbitrary number of two-dimensional vectors consist of two two-dimensional vectors represented respectively by a binary quantity.

38. A welding robot controlling method according to claim 29 or 30, wherein a projecting component of the speed of said tip of said welding torch onto said r vector at said center of weaving is controlled such that said projecting speed becomes a desired welding speed.

39. A welding robot controlling method for controlling a welding robot having a welding torch guided toward a teaching direction and a sensor which intermittently generates a locus correction signal for the tip of said welding torch, comprising
   (1) giving said locus correction signal as a resultant vector of an arbitrary number of two-dimensional vectors on a plane which intersects a welding line direction,
   (2) correcting a locus of said tip of said welding torch by controlling three basic axes of said robot in a direction of a resultant vector composed of a correction vector representing said locus correction signal and a vector which, through a position of said tip of said welding torch, has a direction vector parallel to a line connecting two teaching points, and has a predetermined length, when said locus correction signal is generated,
   (3) controlling said three basic axes of said robot such that said tip of welding torch moves on a line which is parallel to said line connecting said two teaching points and passes through a position of said tip of said welding torch immediately after completion of said locus correction, until a subsequent locus correction signal is given after completion of said locus correction,
   (4) defining and teaching a monitoring point in addition to said two teaching points for an ordinary welding operation to detect an inflection point of a workpiece,
   (5) computing the distance between said monitoring point and the tip of said welding torch,
   (6) recognizing said welding operation to be a profiling welding step to be presently welded and continuing a weld line tracking operation when said distance is monotonically decreasing, or recognizing said inflection point of said step and completing said tracking operation in said step when said distance exceeds a predetermined width of variation, and
   (7) defining the position of said welding torch at said completion of said tracking operation in said preceding step as a new starting point, defining a point, which is determined by three-dimensionally parallelly shifting a previously taught ending point of said next step by a displacement vector between said new starting point and said previously taught ending point of said preceding step, as a new ending point, and controlling said tip of the welding torch so as to make said tip of the welding torch perform a profiling welding in a next step on the basis of a line connecting said new starting point and said new ending point.

40. A welding robot controlling method for controlling a welding robot having a welding torch guided toward a teaching direction and a sensor which intermittently generates a locus correction signal for the tip of said welding torch, comprising
   (1) providing a weaving motion of said tip of said welding torch by controlling the movements of three basic axes of said welding robot,
   (2) giving said locus correction signal as a resultant vector of an arbitrary number of two-dimensional vectors on a plane which intersects a welding line direction,
   (3) correcting a locus of the center of said weaving motion by controlling three basic axes of said robot in a direction of a resultant vector composed of a correction vector representing said locus correction signal and a vector which, through a position of said tip of said welding torch, has a direction vector parallel to a line connecting two teaching points, and has a predetermined length, when said locus correction signal is generated,
   (4) controlling said three basic axes of said robot such that said center of said weaving motion moves on a line which is parallel to said line connecting said two teaching points and passes through a position of said tip of said welding torch immediately after completion of said locus correction, until a subsequent locus correction signal is given after completion of said locus correction,
   (5) defining and teaching a monitoring point in addition to said two teaching points for an ordinary welding operation to detect an inflection point of a workpiece,
   (6) computing the distance between said monitoring point and the center of said weaving,
   (7) recognizing said welding operation to be a profiling welding step to be presently welded and continuing a weld line tracking operation when said distance is monotonically decreasing, or recognizing said inflection point of said step and completing said tracking operation in said step when said distance exceeds a predetermined width of variation, and
   (8) defining the position of said welding torch at said completion of said tracking operation in said preceding step as a new starting point, defining a point, which is determined by three-dimensionally parallelly shifting a previously taught ending point of said next step by a displacement vector between said new starting point and said previously taught ending point of said preceding step, as a new ending point, and controlling said center of weaving so as to make said center of weaving perform a profiling welding in a next step on the basis of a line connecting said new starting point and said new ending point.

41. A welding robot controlling method for controlling a welding robot having a welding torch guided toward a teaching direction and a sensor which intermittently generates a locus correction signal for the tip of said welding torch, comprising
   (1) providing a weaving motion of said tip of said welding torch by controlling the movements of three basic axes of said welding robot,
   (2) generating said locus correction signal by a change of a welding current at both laterally extreme position of said weaving motion,
   (3) giving said locus correction signal as a resultant vector of an arbitrary number of two-dimensional vectors on a plane which intersects a welding line direction,
   (4) correcting a locus of the center of said weaving motion by controlling three basic axes of said robot in a direction of a resultant vector composed of a correction vector representing said locus correction signal and a vector which, through a position of said tip of said welding torch, has a direction vector parallel to a line connecting two teaching points, and has a predetermined length, when said locus correction signal is generated,
(5) controlling said three basic axes of said robot such that said center of said weaving motion moves on a line which is parallel to said line connecting said two teaching points and passes through a position of said tip of said welding torch immediately after completion of said locus correction, until a subsequent locus correction signal is given after completion of said locus correction,
(6) defining and teaching a monitoring point in addition to said two teaching points for an ordinary welding operation to detect an inflection point of a workpiece,
(7) computing the distance between said monitoring point and the center of said weaving,
(8) recognizing said welding operation to be a profiling welding step to be presently welded and continuing a weld line tracking operation when said distance is monotonically decreasing, or recognizing said inflection point of said step and completing said tracking operation in said step when said distance exceeds a predetermined width of variation, and
(9) defining the position of said welding torch at said completion of said tracking operation in said preceding step as a new starting point, defining a point, which is determined by three-dimensionally parallelly shifting a previously taught ending point of said next step by a displacement vector between said new starting point and said previously taught ending point of said preceding step, as a new ending point, and controlling said center of weaving so as to make said center of weaving perform a profiling welding in a next step on the basis of a line connecting said new starting point and said new ending point.

42. A welding robot controlling method for controlling a welding robot having a welding torch guided toward a teaching direction and a sensor which intermittently generates a locus correction signal for the tip of said welding torch, comprising
(1) providing a weaving motion of said tip of said welding torch by controlling the movements of three basic axes of said welding robot,
(2) generating said locus correction signal by a change of a welding voltage at both laterally extreme positions of said weaving motion,
(3) giving said locus correction signal as a resultant vector of an arbitrary number of two-dimensional vectors on a plane which intersects a welding line direction,
(4) correcting a locus of the center of said weaving motion by controlling three basic axes of said robot in a direction of a resultant vector composed of a correction vector representing said locus correction signal and a vector which, through a position of said tip of said welding torch, has a direction vector parallel to a line connecting two teaching points, and has a predetermined length, when said locus correction signal is generated,
(5) controlling said three basic axes of said robot such that said center of said weaving motion moves on a line which is parallel to said line connecting said two teaching points and passes through a position of said tip of said welding torch immediately after completion of said locus correction, until a subsequent locus correction signal is given after completion of said locus correction,
(6) defining and teaching a monitoring point in addition to said two teaching points for an ordinary welding operation to detect an inflection point of a workpiece,
(7) computing the distance between said monitoring point and center of said weaving,
(8) recognizing said welding operation to be a profiling welding step to be presently welded and continuing a weld line tracking operation when said distance is monotonically decreasing, or recognizing said inflection point of said step and completing said tracking operation in said step when said distance exceeds a predetermined width of variation, and
(9) defining the position of said welding torch at said completion of said tracking operation in said preceding step as a new starting point, defining a point, which is determined by three-dimensionally parallelly shifting a previously taught ending point of said next step by a displacement vector between said new starting point and said previously taught ending point of said preceding step, as a new ending point, and controlling said center of weaving so as to make said center of weaving perform a profiling welding in a next step on the basis of a line connecting said new starting point and said new ending point.

43. A welding robot controlling method for controlling a welding robot having a welding torch guided toward a teaching direction and a sensor which intermittently generates a locus correction signal for the tip of said welding torch, comprising
(1) giving said locus correction signal as a resultant vector of an arbitrary number of two-dimensional vectors on a plane which intersects a welding line direction,
(2) correcting a locus of said tip of said welding torch by controlling three basic axes of said robot in a direction of a resultant vector composed of a correction vector representing said locus correction signal and a vector which, through a position of said tip of said welding torch, has a direction vector parallel to a line connecting two teaching points, and has a predetermined length, when said locus correction signal is generated,
(3) controlling said three basic axes of said robot such that said tip of said welding torch moves on a line which is parallel to said line connecting said two teachings points and passes through a position of said tip of welding torch immediately after completion of said locus correction, until a subsequent locus correction signal is given after completion of said locus correction,
(4) storing, in performing profiling welding along an inflection point such as a rectangular inflection point, a position $(x_{n-1}, y_{n-1}, z_{n-1})$ of said welding torch tip at the generation of said preceding locus correction signal and a position $(x_{n-1}', y_{n-1}', z_{n-1}')$ of said welding torch tip at the completion of said preceding locus correction,
(5) projecting a line $l_1$ connecting a position $(x_n, y_n, z_n)$ of said welding torch tip at the moment of generation of the instant locus correction signal and said position $(x_{n-1}, y_{n-1}, z_{n-1})$ of said welding torch tip at the generation of said preceding locus correction signal, on a plane defined by a previously taught line $L_1$ within an instant profiling welding step and a line $L_2$ taught in a next succeeding step, and determining the angle $\xi$ between said projected line and said line $L_1$, (6) determining the angle $\xi$ between the projection of a line $l_2$ connecting a position $(x_n', y_n', z_n')$ of said welding torch tip immediately after the completion of said locus correction and said position $(x_{n-1}', y_{n-1}', z_{n-1}')$ of said welding torch tip at the completion of said preceding locus correction, on said plane defined by said lines $L_1$ and $L_2$, and said line $L_1$, (7) computing the mean value of said angles $\xi$ and $\eta$ before and after every locus correction during said welding operation, (8) storing computed results sequentially in a FIFO memory circuit, (9) recognizing an inflection point, clearing the contents of said FIFO memory circuit when said mean value memorized in said FIFO memory circuit becomes greater than a predetermined value, and completing said profiling welding operation in said step of said line $L_1$, and

(10) defining the position of said welding torch at said completion of the tracking operation in said preceding step as a new starting point, defining a point, which is determined by three-dimensionally parallelly shifting a previously taught ending point of said next step of said line $L_2$ by a displacement vector between said new starting point and said previously taught ending point of said preceding step, as a new ending point, and controlling said welding torch tip so as to make said welding torch tip perform a profiling welding in a next step on the basis of a line connecting said new starting point and said new ending point.

44. A welding robot controlling method for controlling a welding robot having a welding torch guided toward a teaching direction and a sensor which intermittently generates a locus correction signal for the tip of said welding torch, comprising (1) providing a weaving motion of said tip of said welding torch by controlling the movements of three basic axes of said welding robot, (2) giving said locus correction signal as a resultant vector of an arbitrary number of two-dimensional vectors on a plane which intersects a welding line direction, (3) correcting a locus of the center of said weaving motion by controlling three basic axes of said robot in a direction of a resultant vector composed of a correction vector representing said locus correction signal and a vector which, through a position of said tip of said welding torch, has a direction vector parallel to a line connecting two teaching points, and has a predetermined length, said said locus correction signal is generated, (4) controlling said three basic axes of said robot such that said center of said weaving motion moves on a line which is parallel to said line connecting said two teaching points and passes through a position of said tip of said welding torch immediately after completion of said locus correction, until a subsequent locus correction signal is given after completion of said locus correction, (5) storing, in performing profiling welding along an inflection point such as a rectangular inflection point, a position $(x_{n-1}, y_{n-1}, z_{n-1})$ of said center of weaving at the generation of said preceding locus correction signal and a position $(x_{n-1}', y_{n-1}', z_{n-1}')$ of said center of weaving at the completion of said preceding locus correction, (6) projecting a line $l_1$ connecting a position $(x_n, y_n, z_n)$ of said center of weaving at the moment of generation of the instant locus correction signal and said position $(x_{n-1}, y_{n-1}, z_{n-1})$ of said center of weaving at the generation of said preceding locus correction signal, on a plane defined by a previously taught line $L_1$ within the instant profiling welding step and a line $L_2$ taught in the next succeeding step, and determining the angle $\xi$ between said projected line and said line $L_1$, (7) determining the angle $\eta$ between the projection of a line $l_2$ connecting a position $(x_n', y_n', z_n')$ of said center of weaving immediately after the completion of said locus correction and said position $(x_{n-1}', y_{n-1}', z_{n-1}')$ of said center of weaving at the completion of said preceding locus correction, on said plane defined by said lines $L_1$ and $L_2$, and said line $L_1$, (8) computing the mean value of said angles $\xi$ and $\eta$ before and after every locus correction during said welding operation, (9) storing computed results sequentially in a FIFO memory circuit,

(10) recognizing an inflection point, clearing the contents of said FIFO memory circuit when said mean value memorized in said FIFO memory circuit becomes greater than a value of a function of the welding speed, weaving frequency and the amount of locus correction, and completing said profiling welding operation in said step of said line $L_1$, and

(11) defining the position of said welding torch at said completion of the tracking operation in said preceding step as a new starting point, defining a point, which is determined by three-dimensionally parallelly shifting a previously taught ending point of said next step of said line $L_2$ by a displacement vector between said new starting point and said previously taught ending point of said preceding step, as a new ending point, and controlling said center of weaving so as to make said center of weaving perform a profiling welding in a next step on the basis of a line connecting said new starting point and said new ending point.

45. A welding robot controlling method for controlling a welding robot having a welding torch guided toward a teaching direction and a sensor which intermittently generates a locus correction signal for the tip of said welding torch, comprising (1) providing a weaving motion of said tip of said welding torch by controlling the movements of three basic axes of said welding robot, (2) generating said locus correction signal by a change of the welding current at both laterally extreme positions of said weaving motion, (3) giving said locus correction signal as a resultant vector of an arbitrary number of two-dimensional vectors on a plane which intersects a welding line direction, (4) correcting a locus of the center of said weaving motion by controlling three basic axes of said robot in a direction of a resultant vector composed of a correction vector representing said locus correction signal and a vector which, through a position of said tip of said welding torch, has a direction vector parallel to a line connecting two teaching points, and has a predetermined length, when said locus correction signal is generated, (5) controlling said three basic axes of said robot such that said center of said weaving motion moves on a line which is parallel to said line connecting said two teaching points and passes through a position of said tip of said welding torch immediately after completion of said locus correction, until a subsequent locus correction signal is given after completion of said locus correction, (6) storing, in performing profiling welding along an inflection point such as a rectangular inflection point, a position $(x_{n-1}, y_{n-1}, z_{n-1})$ of said center of weaving at the generation of said preceding locus correction signal and a position $(x_{n-1}', y_{n-1}', z_{n-1}')$ of said center of weaving at the completion of said preceding locus correction, (7) projecting a line $l_1$ connecting a position $(x_n, y_n, z_n)$ of said center of weaving at the moment of generation of the instant locus correction signal and said position $(x_{n-1}, y_{n-1}, z_{n-1})$ of said center of weaving at the generation of said preceding locus correction signal, on a plane defined by a previously taught line $L_1$ within the instant profiling welding step and a line $L_2$ taught in the next succeeding step, and determining the angle $\xi$ between said projected line and said line $L_1$, (8) determining the angle $\eta$ between the projection of a line $l_2$ connecting a position $(x_n', y_n', z_n')$ of said center of weaving immediately after the completion of said locus correction and said position $(x_{n-1}', y_{n-1}', z_{n-1}')$ of said center of weaving at the completion of said preceding locus correction, on said plane defined by said lines $L_1$ and $L_2$, and said line $L_1$, (9) computing the mean value of said angles $\xi$ and $\eta$ before and after every locus correction during said welding operation,

(10) storing computed results sequentially in a FIFO memory circuit,

(11) recognizing an inflection point, clearing the contents of said FIFO memory circuit when said mean value memorized in said FIFO memory circuit becomes greater than a value of a function of the welding speed, weaving frequency and the amount of locus correction and completing said profiling welding operation in said step of said line $L_1$, and

(12) defining the position of said welding torch at said completion of the tracking operation in said preceding step as a new starting point, defining a point, which is determined by three-dimensionally parallelly shifting a previously taught ending point of said next step of said line $L_2$ by a displacement vector between said new starting point and said previously taught ending point of said preceding step, as a new ending point, and controlling said center of weaving so as to make said center of weaving perform a profiling welding in a next step on the basis of a line connecting said new starting point and said new ending point.

46. A welding robot controlling method for controlling a welding robot having a welding torch guided toward a teaching direction and a sensor which intermittently generates a locus correction signal for the tip of said welding torch, comprising (1) providing a weaving motion of said tip of said welding torch by controlling the movements of three basic axes of said welding robot, (2) generating said locus correction signal by a change of the welding voltage at both laterally extreme positions, (3) giving said locus correction signal as a resultant vector of an arbitrary number of two-dimensional vectors on a plane which intersects a welding line direction, (4) correcting a locus of the center of said weaving motion by controlling three basic axes of said robot in a direction of a resultant vector composed of a correction vector representing said locus correction signal and a vector which, through a position of said tip of said welding torch, has a direction vector parallel to a line connecting two teaching points, and has a predetermined length, when said locus correction signal is generated, (5) controlling said three basic axes of said robot such that said center of said weaving motion moves on a line which is parallel to said line connecting said two teaching points and passes through a position of said tip of said welding torch immediately after completion of said locus correction, until a subsequent locus correction signal is given after completion of said locus correction, (6) storing, in performing profiling welding along an inflection point such as a rectangular inflection point, a position $(x_{n-1}, y_{n-1}, z_{n-1})$ of said center of weaving at the generation of said preceding locus correction signal and a position $(x_{n-1}', y_{n-1}', z_{n-1}')$ of said center of weaving at the completion of said preceding locus correction, (7) projecting a line 1 connecting a position $(x_n, y_n, z_n)$ of said center of weaving at the moment of generation of the instant locus correction signal and said position $(x_{n-1}, y_{n-1}, z_{n-1})$ of said center of weaving at the generation of said preceding locus correction signal, on a plane defined by a previously taught line $L_1$ within the instant profiling welding step and a line $L_2$ taught in the next succeeding step, and determining the angle between said projected line and said line $L_1$, (8) determining the angle $\eta$ between the projection of a line $l_2$ connecting a position $(x_n', y_n', z_n')$ of said center of weaving immediately after the completion of said locus correction and said position $(x_{n-1}', y_{n-1}', z_{n-1}')$ of said center of weaving at the completion of said preceding locus correction, on said plane defined by said lines $L_1$ and $L_2$, and said line $L_1$, (9) computing the mean value of said angles $\xi$ and $\eta$ before and after every locus correction during said welding operation,

(10) storing computed results sequentially in a FIFO memory circuit,

(11) recognizing an inflection point, clearing the contents of said FIFO memory circuit when said mean value memorized in said FIFO memory circuit becomes greater than a value of a function of the welding speed, weaving frequency and the amount of locus correction and completing said profiling welding operation in said step of said line $L_1$, and

(12) defining the position of said welding torch at said completion of the tracking operation in said preceding step as a new starting point, defining a point, which is determined by three-dimensionally parallelly shifting a previously taught ending point of said next step of said line $L_2$ by a displacement vector between said new starting point and said previously taught ending point of said preceding step, as a new ending point, and controlling said center of weaving so as to make said center of weaving perform a profiling welding in a next step on the basis of a line connecting said new starting point and said new ending point.

47. A welding robot controlling method for controlling a welding robot having a welding torch guided toward a teaching direction and a sensor which intermittently generates a locus correction signal for the tip of said welding torch, when an actual weld starting position is deviated from the previously taught weld starting position, comprising
   (1) providing a weaving motion of said tip of said welding torch by controlling the movements of three basic axes of said welding robot,
   (2) giving said locus correction signal as a resultant vector of an arbitrary number of two-dimensional vectors on a plane which intersects a welding line direction,
   (3) correcting a locus of a center of said weaving motion by controlling three basic axes of said robot in a direction of a resultant vector composed of a correction vector representing said locus correction signal and a vector which, through a position of said tip of said welding torch, has a direction vector parallel to a line connecting two teaching points, and has a predetermined length, when said locus correction signal is generated,
   (4) controlling said three basic axes of said robot such that said center of said weaving motion moves on a line which is parallel to said line connecting said two teaching points and passes through a position of said tip of said welding torch immediately after completion of said locus correction, until a subsequent locus correction signal is given after completion of said locus correction,
   (5) extremely reducing the welding speed and the welding current comparatively to a normal welding speed and a normal welding current respectively, until said welding torch reaches said actual welding line,
   (6) increasing the amount of said locus correction comparatively to said normal amount of locus correction, until said welding torch reaches said actual welding line,
   (7) controlling the movements of the three basic axes of said robot to make said tip of said welding torch carry out a weaving motion in a perpendicular direction with respect to said taught line,
   (8) increasing the weaving frequency comparatively to normal weaving frequency, until said welding torch reaches said actual welding line,
   (9) generating said locus correction signal by the change of welding current between both laterally extreme positions of said weaving,
   (10) storing, in performing profiling welding on a workpiece plate, a position $(x_{n-1}, y_{n-1}, z_{n-1})$ of said center of weaving at the generation of said preceding locus correction signal and a position $(x_{n-1}', y_{n-1}', z_{n-1}')$ of said center of weaving at the completion of said preceding locus correction,
   (11) projecting a line $l_1$ connecting a position $(x_n, y_n, z_n)$ of said center of weaving at the moment of generation of the instant locus correction signal and said position $(x_{n-1}, y_{n-1}, z_{n-1})$ of said center of weaving at the generation of said preceding locus correction signal, on a plane defined by a previously taught line $L_1$ within the instant profiling welding step and a line $L_2$ taught in the next succeeding step, and determining the angle $\xi$ between said projected line and said line $L_1$,
   (12) determining the angle $\eta$ between the projection of a line $l_2$ connecting a position $(x_n', y_n', z_n')$ of said center of weaving immediately after the completion of said locus correction and said position $(x_{n-1}', y_{n-1}', z_{n-1}')$ of said center of weaving at the completion of said preceding locus correction, on said plane defined by said lines $L_1$ and $L_2$, and said line $L_1$,
   (13) computing the mean value of said angles $\xi$ and $\eta$ before and after every locus correction during said welding operation,
   (14) storing computed results sequentially in a FIFO memory circuit,
   (15) recognizing a normal weld starting position, clearing the contents of said FIFO memory circuit when said mean value memorized in said FIFO memory circuit becomes smaller than a value of a function of the welding speed, weaving frequency and the amount of locus correction, and completing such a searching operation,
   (16) determining the position of said welding torch at said completion of said searching operation as said actual weld starting position, and
   (17) setting said welding speed, said welding current, said amount of locus correction and said weaving frequency to normal values, namely, previously taught values, and continuing profiling welding on the basis of a previously taught path.

48. A welding robot controlling method for controlling a welding robot having a welding torch guided toward a teaching direction and a sensor which intermittently generates a locus correction signal for the tip of said welding torch, when an actual weld starting position is deviated from the previously taught weld starting position, comprising
   (1) providing a weaving motion of said tip of said welding torch by controlling the movements of three basic axes of said welding robot,
   (2) giving said locus correction signal as a resultant vector of an arbitrary number of two-dimensional vectors on a plane which intersects a welding line direction,
   (3) correcting a locus of a center of said weaving motion by controlling three basic axes of said robot in a direction of a resultant vector composed of a correction vector representing said locus correction signal and a vector which, through a position of said tip of said welding torch, has a direction vector parallel to a line connecting two teaching points, and has a predetermined length, when said locus correction signal is generated,
   (4) controlling said three basic axes of said robot such that said center of said weaving motion moves on a line which is parallel to said line connecting said two teaching points and passes through a position of said tip of said welding torch immediately after completion of said locus correction, until a subsequent locus correction signal is given after completion of said locus correction,
   (5) extremely reducing the welding speed and the welding voltage comparatively to a normal welding speed and a normal welding voltage respectively, until said welding torch reaches said actual welding line, (6) increasing the amount of said locus correction comparatively to said normal amount of locus correction, until said welding torch reaches said actual welding line, (7) controlling the movements of the three basic axes of said robot to make said tip of said welding torch conduct a weaving motion in a perpendicular direction with respect to said taught line, (8) increasing the weaving frequency comparatively to normal weaving frequency, until said welding torch reaches said actual welding line, (9) generating said locus correction signal by the change of welding voltage between both laterally extreme positions of said weaving,

(10) storing, in performing profiling welding on a workpiece plate, a position $(x_{n-1}, y_{n-1}, z_{n-1})$ of said center of weaving at the generation of said preceding locus correction signal and a position $(x_{n-1}', y_{n-1}', z_{n-1}')$ of said center of weaving at the completion of said preceding locus correction,

(11) projecting a line $l_1$ connecting a position $(x_n, y_n, z_n)$ of said center of weaving at the moment of generation of the instant locus correction signal and said position $(x_{n-1}, y_{n-1}, z_{n-1})$ of said center of weaving at the generation of said preceding locus correction signal, on a plane defined by a previously taught line $L_1$ within the instant profiling welding step and a line $L_2$ taught in the next succeeding step, and determining the angle $\xi$ between said projected line and said line $L_1$,

(12) determining the angle $\eta$ between the projection of a line $l_2$ connecting a position $(x_n', y_n', z_n')$ of said center of weaving immediately after the completion of said locus correction and said position $(x_{n-1}', y_{n-1}', z_{n-1}')$ of said center of weaving at the completion of said preceding locus correction, on said plane defined by said lines $L_1$ and $L_2$, and said line $L_1$,

(13) computing the mean value of said angles $\xi$ and $\eta$ before and after every locus correction during said welding operation,

(14) storing computed results sequentially in a FIFO memory circuit,

(15) recognizing a normal weld starting position, clearing the contents of said FIFO memory circuit when said mean value memorized in said FIFO memory circuit becomes smaller than a value of a function of the welding speed, weaving frequency and the amount of locus correction, and completing such a searching operation,

(16) determining the position of said welding torch at said completion of said searching operation as said actual weld starting position, and

(17) setting said welding speed, said welding voltage, said amount of locus correction and said weaving frequency to normal values, namely previously taught values, and continuing profiling welding on the basis of a previously taught path.

* * * * *